United States Patent
Carleton et al.

(10) Patent No.: US 11,186,518 B2
(45) Date of Patent: Nov. 30, 2021

(54) METHODS OF MAKING A GLASS ARTICLE WITH A STRUCTURED SURFACE

(71) Applicant: CORNING INCORPORATED, Corning, NY (US)

(72) Inventors: Tracie Lynne Carleton, Tioga, PA (US); Leonard Charles Dabich, II, Painted Post, NY (US); David Alan Deneka, Corning, NY (US); Mandakini Kanungo, Painted Post, NY (US); Shenping Li, Painted Post, NY (US); Xiang-Dong Mi, Pittsford, NY (US); Mark Alejandro Quesada, Horseheads, NY (US); Wageesha Senaratne, Horseheads, NY (US); John Charles Speeckaert, Painted Post, NY (US); Louis Joseph Stempin, Jr., Corning, NY (US); Wanda Janina Walczak, Big Flats, NY (US); Haregewine Tadesse Woldegiworgis, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/486,562

(22) PCT Filed: Feb. 15, 2018

(86) PCT No.: PCT/US2018/018320
§ 371 (c)(1),
(2) Date: Aug. 16, 2019

(87) PCT Pub. No.: WO2018/152300
PCT Pub. Date: Aug. 23, 2018

(65) Prior Publication Data
US 2020/0002224 A1    Jan. 2, 2020

Related U.S. Application Data

(60) Provisional application No. 62/629,632, filed on Feb. 12, 2018, provisional application No. 62/459,641, (Continued)

(51) Int. Cl.
*C03C 19/00* (2006.01)
*C03C 3/083* (2006.01)
(Continued)

(52) U.S. Cl.
CPC .............. *C03C 19/00* (2013.01); *C03C 3/083* (2013.01); *C03C 15/02* (2013.01); *G02B 6/0065* (2013.01);
(Continued)

(58) Field of Classification Search
None
See application file for complete search history.

(56) References Cited

U.S. PATENT DOCUMENTS 4,256,533 A   3/1981   Mayer
4,392,362 A   7/1983   Little
(Continued)

FOREIGN PATENT DOCUMENTS

CN    1731280 A  *  2/2006
CN    101932968 A   12/2010
(Continued)

OTHER PUBLICATIONS

International Search Report and Written Opinion of the International Searching Authority; PCT/US2018/018320; dated May 28, 2018; 14 Pages; European Patent Office.
(Continued)

*Primary Examiner* — Stephanie P Duclair

(57) ABSTRACT

A method of making a glass article, for example a glass light guide plate comprising at least one structured surface includ-
(Continued)

ing a plurality of channels and peaks. The glass article may be suitable for enabling one dimensional dimming when used in a backlight unit for use as an illuminator for liquid crystal display devices.

18 Claims, 20 Drawing Sheets

Related U.S. Application Data filed on Feb. 16, 2017, provisional application No. 62/579,525, filed on Oct. 31, 2017.

(51) Int. Cl.
  *C03C 15/02* (2006.01)
  *F21V 8/00* (2006.01)
(52) U.S. Cl.
  CPC ............ *G02B 6/002* (2013.01); *G02B 6/0016* (2013.01); *G02B 6/0078* (2013.01)

(56) References Cited

U.S. PATENT DOCUMENTS

| | | | |
|---|---|---|---|
| 6,045,715 A * | 4/2000 | Spierings | C03C 19/00 216/47 |
| 6,074,069 A | 6/2000 | Chao-Ching et al. | |
| 6,727,963 B1 | 4/2004 | Taniguchi et al. | |
| 8,421,954 B1 | 4/2013 | Moon | |
| 9,778,506 B2 | 10/2017 | Hur et al. | |
| 2008/0142477 A1 * | 6/2008 | Jacobs | C03C 15/00 216/49 |
| 2008/0285307 A1 | 11/2008 | Aylward et al. | |
| 2009/0308525 A1 | 12/2009 | Lin et al. | |
| 2013/0077020 A1 | 3/2013 | Rohrmoser et al. | |
| 2014/0158300 A1 * | 6/2014 | Hayata | C03B 19/00 156/345.3 |
| 2015/0060401 A1 * | 3/2015 | Chang | C03C 17/32 216/38 |
| 2015/0175478 A1 * | 6/2015 | Ravichandran | C03C 15/00 428/141 |
| 2017/0254948 A1 | 9/2017 | Dai et al. | |

FOREIGN PATENT DOCUMENTS

| | | | |
|---|---|---|---|
| CN | 1891652 | * | 5/2011 |
| CN | 102902157 A | | 1/2013 |
| CN | 105683114 A | | 6/2016 |
| CN | 106030348 A | | 10/2016 |
| CN | 106125513 A | | 11/2016 |
| CN | 106415124 A | | 2/2017 |
| JP | 2011194885 | * | 10/2011 |
| JP | 2017091940 A | | 5/2017 |
| JP | 2017111987 A | | 6/2017 |
| TW | 271472 B | | 3/1996 |
| TW | 200628920 A | | 8/2006 |
| WO | 2013148660 A1 | | 10/2013 |
| WO | 2015/191418 A1 | | 12/2015 |
| WO | 2016043988 A1 | | 3/2016 |
| WO | 2018152295 A1 | | 8/2018 |
| WO | 2018152300 A1 | | 8/2018 |

OTHER PUBLICATIONS

Jung et al.; "P-87: Local Dimming Design and Optimization for Edge-Type LED Backlight Unit" SID 11 Digest (2011); pp. 1430-1432.

Kim et al.; "46.1: Directivity Enhanced BLU for Edge-Type Local Dimming" ; SID 11 Digest (2011) pp. 662-664.

Mellott et al.; "Evaluation of Surface Preparation Methods for Glass" ; Surf. Interface Anal.; 31 (2001) pp. 362-368.

International Search Report and Written Opinion of the International Searching Authority; PCT/US2018/018327; dated Nov. 20, 2018; 13 Pages; European Patent Office.

Taiwanese Patent Application No. 107105577, Office Action dated Aug. 6, 2021, 3 pages (English Translation Only); Taiwanese Patent Office.

Chinese Patent Application No. 201880024383.2, Office Action dated Sep. 3, 2021, 13 pages (5 pages of English Translation and 8 pages of Original Document), Chinese Patent Office.

* cited by examiner

METHODS OF MAKING A GLASS ARTICLE WITH A STRUCTURED SURFACE

CROSS-REFERENCE FOR RELATED APPLICATIONS

This application claims the benefit of priority under 35 U.S.C. § 371 of International Application No. PCT/US18/018320, filed on Feb. 15, 2018, which claims the benefit of priority of U.S. Provisional Application Ser. No. 62/629,632 filed on Feb. 12, 2018 and U.S. Provisional Application Ser. No. 62/459,641 filed on Feb. 16, 2017 and U.S. Provisional Application Ser. No. 62/579,525 filed on Oct. 31, 2017 the contents of which are relied upon and incorporated herein by reference in their entirety.

BACKGROUND

Field

The present disclosure relates generally to a method of making a glass article, for example a glass light guide plate that can be included in a backlight unit for illuminating a liquid crystal display device, and in particular a glass light guide plate including a structured glass surface configured for one dimensional dimming.

Technical Background

While organic light emitting diode display devices are gaining in popularity, costs are still high, and liquid crystal display (LCD) devices still represent the majority of display devices sold, particularly large panel size devices, such as television sets and other large-format devices such as commercial signs. Unlike organic light emitting diode (OLED) display panels, LCD panels do not themselves emit light, and are therefore dependent on a backlight unit (BLU) positioned behind the LCD panel to provide transmissive light to the LCD panel. Light from the BLU illuminates the LCD panel and the LCD panel functions as a light valve that selectively allows light to pass through pixels of the LCD panel or be blocked, thereby forming a viewable image.

Without augmentation, the native contrast ratio achievable with an LCD display is the ratio of the brightest portion of an image to the darkest portion of the image. The simplest contrast augmentation occurs by increasing the overall illumination for a bright image, and decreasing the overall illumination for a dark image. Unfortunately, this leads to muted brights in a dark image, and washed out darks in a bright image. To overcome this limitation, manufacturers can incorporate active local dimming of the image, wherein the illumination within predefined regions of the display panel can be locally dimmed relative to other regions of the display panel, depending on the image being displayed. Such local dimming can be relatively easily incorporated when the light source is positioned directly behind the LCD panel, for example a two dimensional array of LEDs. However, local dimming is more difficult to incorporate with an edge lighted BLU, wherein an array of LEDs is arranged along an edge of a light guide plate incorporated into the BLU.

Typical BLU's include a light guide plate (LGP) into which light is injected via a light source (e.g., an array of light sources), guided within the LGP, and then directed outward, for example by scattering, toward the LCD panel. LGP's generally incorporate a polymer light guide, such as poly methyl methacrylate (PMMA). PMMA is easily formed, and can be molded or machined to facilitate local dimming. However, PMMA can suffer from thermal degradation, comprises a relatively large coefficient of thermal expansion, suffers from moisture absorption and is easily deformed. On the other hand, glass is dimensionally stable (comprises a relatively low coefficient of thermal expansion), and can be produced in large thin sheets suitable for the growing popularity of large, thin TVs. Accordingly, it would be desirable to produce BLUs that include glass light guide plates capable of facilitating local dimming.

SUMMARY

Plastic light guide plates configured for 1D dimming typically include a corrugated surface comprising alternating rows of channels and peaks to confine the light to a particular zone into which light is injected. However, for at least the reasons described above, plastic light guides suffer from various shortcomings. To overcome the limitations of plastic (e.g., PMMA) light guide plates in display devices with local dimming, light guide plates comprising glass sheets with at least one structured glass surface are described.

The surface features that provide one dimensional (1D) local dimming, which is highly desired for LCDs, is more challenging to manufacture in glass than in plastics. One dimensional local dimming allows various sought-after LCD attributes, such as high dynamic range (contrast), high refresh rates, and energy savings. For an edge-lighted BLU, this function is enabled by manufacturing surface structures, most commonly in the shape of a lenticular lens array, on one surface of a plastic (e.g., PMMA) LGP. Since the glass transition temperature of PMMA is only 160° C., this can be relatively easily accomplished using hot embossing, injection molding, or extrusion. An alternative is to laminate a plastic lenticular lens array film to one surface of a glass LGP. However, this approach causes at least two issues. One issue is that the higher optical attenuation of plastic materials introduces a significant color shift. Glass, for example glasses described herein can have an optical attenuation less than about 2 dB/meter over the visible wavelength range (from about 390 nm to about 700 nm), for example equal to or less than about 0.5 dB/meter. Another issue is reliability. Because the coefficient of thermal expansion (CTE) of PMMA is much higher than that of various glasses, variations of temperature and humidity can cause delamination between the plastic lenticular lens array film and the glass. Another alternative is to form a lenticular lens array directly in a very thin plastic coating on the surface of the glass, for example by micro-replication. Because the base thickness of the lenticular lens array is significantly reduced to tens of micrometers (from hundreds of micrometers for the first approach), the color shift introduced by the lenticular lens array is reduced. However, this does not eliminate the reliability issue, and a careful selection of plastic material is required to achieve low color shift.

Accordingly, a method of making a glass article is disclosed, comprising depositing an etch mask on a first major surface of a glass sheet, the etch mask forming a plurality of parallel rows on the first major surface, exposing the glass sheet to an etchant, thereby removing glass from the first major surface of the glass sheet between the plurality of parallel rows, the removing glass forming a plurality of channels in the first major surface of the glass sheet, and removing the etch mask, the resultant glass article comprising a glass sheet with a plurality of channels formed in the first major surface, at least one channel of the plurality of channels comprising a depth H in a range from about 5 µm to about 300 µm, a width S defined at H/2, and wherein a ratio S/H is in a range from about 1 to about 15.

The method may further comprise depositing an adhesion layer on the first major surface prior to depositing the etch mask. In some embodiments, the adhesion layer can comprise a silane layer or a siloxane layer. In some embodiments, the adhesion layer comprises an epoxysilane layer.

The adhesion layer can be applied, for example, by spin coating or dip coating.

In some embodiments, the etch mask is applied by a screen printing process. The screen printing process can comprise forming a cured emulsion pattern on a surface of a woven screen, wherein a string angle of the woven screen relative to the cured emulsion pattern is in a range from about 20° to about 45°.

In some embodiments, the woven screen comprises stainless steel wires.

In some embodiments, the etchant comprises HF. The etchant may further comprises $HNO_3$, $H_2SO_4$ or HCL. The etchant may be an aqueous solution of 10% by volume HF and $H_2SO_4$ in an amount from about 10% to about 30%, for example $H_2SO_4$ in an amount from about 10% to about 20%.

In some embodiments, the exposing comprises spraying the etchant onto the glass sheet.

In other embodiments, the exposing comprises placing the glass sheeting into a bath of the etchant. The exposing may comprise agitating the etchant during the exposing.

In embodiments, the method can include controlling undercutting of the glass sheet beneath the etch mask by controlling adhesion of the etch mask to the glass sheet. For example, a ratio of the maximum undercutting M to the channel depth H can be controlled to be within a range from about 1.2 to about 1.8.

The glass article resulting from the method can comprise a light guide plate.

In some embodiments, a maximum thickness T of the glass sheet is in a range from about 0.1 mm to about 2.1 mm, for example in a range from about 0.6 mm to about 2.1 mm.

In some embodiments, the etch mask can comprise a thermoplastic material, wherein the thermoplastic material is applied to the glass sheet through a heated nozzle. A coefficient of thermal expansion of the thermoplastic should be within about 10% of a coefficient of thermal expansion of the glass sheet.

In other embodiments, a method of making a glass article is described, comprising depositing an etch mask on a first major surface of a glass sheet, the etch mask forming a plurality of parallel rows on the first major surface, exposing the glass sheet to an abrasive stream, thereby removing glass from the first major surface of the glass sheet between the plurality of parallel rows, the removing glass forming a plurality of channels in the first major surface of the glass sheet, and removing the etch mask, wherein the resultant glass article comprises a glass sheet with a plurality of channels formed in the first major surface, at least one channel of the plurality of channels comprising a depth H in a range from about 5 µm to about 300 µm, a width S defined at H/2, and wherein a ratio S/H is in a range from about 1 to about 15.

The method may further comprise smoothing surfaces of the plurality of channels, such as by flame polishing or abrasive polishing.

An RMS roughness of a sidewall of the at least one channel formed by abrasion can be equal to or less than about 5 µm when measured by white light interferometry.

Additional features and advantages of the embodiments disclosed herein will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments intended to provide an overview or framework for understanding the nature and character of the disclosed embodiments. The accompanying drawings are included to provide further understanding, and are incorporated into and constitute a part of this specification. The drawings illustrate various embodiments of the disclosure and together with the description serve to explain the principles and operations thereof.

DETAILED DESCRIPTION

Figure 1:
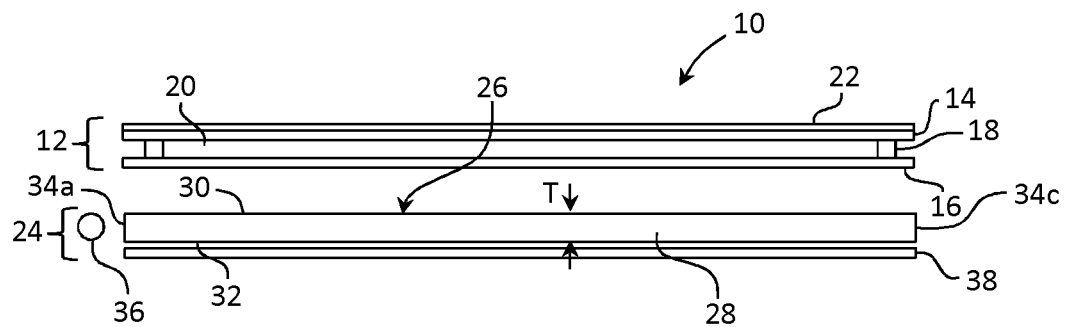
FIG. 1 is a cross sectional view of an exemplary LCD display device.

Reference will now be made in detail to embodiments of the present disclosure, examples of which are illustrated in the accompanying drawings. Whenever possible, the same reference numerals will be used throughout the drawings to refer to the same or like parts. However, this disclosure may be embodied in many different forms and should not be construed as limited to the embodiments set forth herein.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as may be used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus, specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Current light guide plates used in LCD back light applications are typically formed with PMMA, as PMMA exhibits reduced optical absorption compared to many alternative materials. However, PMMA can present certain mechanical drawbacks that make the design of large size (e.g., 32 inch diagonal and greater) displays challenging. Such drawbacks include poor rigidity, high moisture absorption, and a relatively large coefficient of thermal expansion (CTE).

For example, conventional LCD panels are made of two pieces of thin glass (e.g., color filter substrate and TFT backplane), with the BLU comprising a PMMA light guide and a plurality of thin plastic films (diffusers, dual brightness enhancement films (DBEF) films, etc.) positioned behind the LCD panel. Due to the poor elastic modulus of PMMA, the overall structure of the LCD panel exhibits low rigidity, and additional mechanical structure may be necessary to provide stiffness for the LCD panel, thereby adding mass to the display device. It should be noted that a Young's modulus of PMMA is generally about 2 gigaPascal (GPa), while certain exemplary glasses can comprise a Young's modulus ranging from about 60 GPa to 90 GPa or more.

Humidity testing shows that PMMA is sensitive to moisture and can undergo dimensional changes by up to about 0.5%. Thus, for a PMMA panel with a length of one meter, a 0.5% change can increase the panel length by up to 5 mm, which is significant and makes the mechanical design of a corresponding BLU challenging. Conventional approaches to solve this problem include leaving an air gap between the LEDs and the PMMA LGP to allow the PMMA LGP to expand. However, light coupling between the LEDs and the LGP is extremely sensitive to the distance from the LEDs to the LGP, and the increased distance can cause display brightness to change as a function of humidity. Moreover, the greater the distance between the LEDs and the LGP, the less efficient the light coupling between the two.

Still further, PMMA comprises a CTE of about $75 \times 10^{-6}/°$C., and comprises a relatively low thermal conductivity (approximately 0.2 watts/meter/Kelvin, W/m/K). In comparison, some glasses suitable for use as an LGP can comprise a CTE less than about $8 \times 10^{-6}/°$ C. with a thermal conductivity of 0.8 W/m/K or more. Accordingly, glass as a light guiding medium for BLUs offers superior qualities not found in polymer (e.g., PMMA) LGPs.

Additionally, an all-glass light guide exhibits inherently low color shift, does not exhibit polymeric-like aging or "yellowing" under high illumination flux, and can incorporate lenticular designs and uniform total internal reflection (TIR) redirection that enables a reduction in the number of optical components in a display. These attributes are highly desired by customers.

FIG. 1 depicts an exemplary LCD display device 10 comprising an LCD display panel 12 formed from a first substrate 14 and a second substrate 16 joined by an adhesive material 18 positioned between and around a peripheral edge portion of the first and second substrates. First and second substrates 14, 16 are typically glass substrates. First and second substrates 14, 16 and adhesive material 18 form a gap 20 therebetween containing liquid crystal material. Spacers (not shown) may also be used at various locations within the gap to maintain consistent spacing of the gap. First substrate 14 may include color filter material. Accordingly, first substrate 14 may be referred to as the color filter substrate. On the other hand, second substrate 16 includes thin film transistors (TFTs) for controlling the polarization state of the liquid crystal material, and thus may be referred to as the backplane substrate, or simply backplane. LCD panel 12 may further include one or more polarizing filters 22 positioned on a surface thereof.

Figure 2:
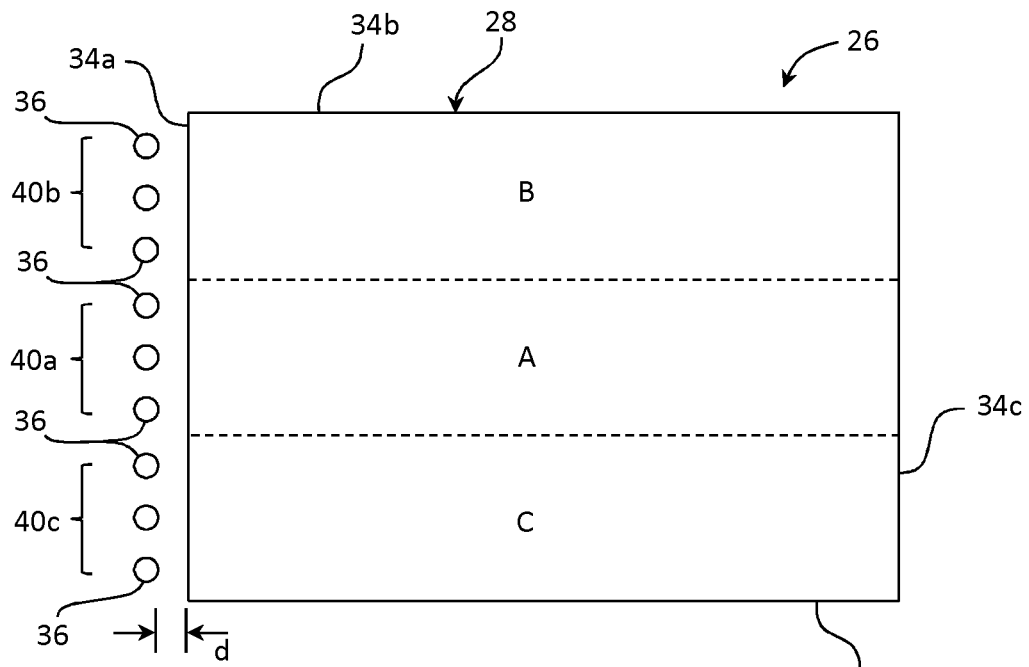
FIG. 2 is a top view of an exemplary light guide plate.

LCD display device 10 further comprises BLU 24 arranged to illuminate LCD panel 12 from behind, i.e., from the backplane side of the LCD panel. In some embodiments, the BLU may be spaced apart from the LCD panel, although in further embodiments, the BLU may be in contact with or coupled to the LCD panel, such as with a transparent adhesive (e.g., a CTE-matched adhesive). BLU 24 comprises a glass light guide plate LGP 26 formed with a glass sheet 28 as the light guide, glass sheet 28 including a first major surface 30 (i.e., first glass surface 30), a second major surface 32 (i.e., second glass surface 32), and a plurality of edge surfaces extending between the first and second major surfaces. In embodiments, glass sheet 28 may be a parallelogram, for example a square or rectangle as shown in FIG. 2, and comprise four edge surfaces 34a, 34b, 34c and 34d extending between the first and second major surfaces. For example, edge surface 34a may be opposite edge surface 34c, and edge surface 34b may be positioned opposite edge surface 34d. Edge surface 34a may be parallel with opposing edge surface 34c, and edge surface 34b may be parallel with opposing edge surface 34d. Edge surfaces 34a and 34c may be orthogonal to edge surfaces 34b and 34d. The edge surfaces 34a-34d may be planar and orthogonal to, or substantially orthogonal (e.g., 90+/−1 degree, for example 90+/−0.1 degree) to major surfaces 30, 32, although in further embodiments, the edge surfaces may include chamfers, for example a planar center portion orthogonal to, or substantially orthogonal to major surfaces 30, 32 and joined to the first and second major surfaces by two adjacent angled surface portions.

First and/or second major surfaces 30, 32 may include an average roughness (Ra) in a range from about 0.1 nanometer (nm) to about 0.6 nm, for example less than about 0.6 nm, less than about 0.5 nm, less than about 0.4 nm, less than about 0.3 nm, less than about 0.2 nm, or in some embodiments, less than about 0.1 nm. An average roughness (Ra) of the edge surfaces may be equal to or less than about 0.05 micrometers (μm), for example in a range from about 0.005 micrometers to about 0.05 micrometers.

The foregoing roughness of the major surface(s) can be achieved, for example, by using a fusion draw process, or a float glass process followed by polishing. Surface roughness may be measured, for example, by atomic force microscopy, white light interferometry with a commercial system such as those manufactured by Zygo®, or by laser confocal microscopy with a commercial system such as those provided by Keyence. The scattering from the surface may be measured by preparing a plurality of samples identical except for the surface roughness, and then measuring the internal transmittance of each. The difference in internal transmittance between samples is attributable to the scattering loss induced by the roughened surface. Edge roughness can be achieved by grinding and/or polishing.

Glass sheet 28 further comprises a maximum thickness T in a direction orthogonal to and extending between first major surface 30 and second major surface 32. In some embodiments, thickness T may be equal to or less than about 3 mm, for example equal to or less than about 2 mm, or equal to or less than about 1 mm, although in further embodiments, thickness T may be in a range from about 0.1 mm to about 3 mm, for example in a range from about 0.1 mm to about 2.5 mm, in a range from about 0.3 mm to about 2.1 mm, in a range from about 0.5 mm to about 2.1 mm, in a range from about 0.6 to about 2.1, or in a range from about 0.6 mm to about 1.1 mm, including all ranges and subranges therebetween.

In various embodiments, the glass composition of glass sheet 28 can comprise between 60-80 mol % $SiO_2$, between 0-20 mol % $Al_2O_3$, and between 0-15 mol % $B_2O_3$, and comprise less than about 50 ppm iron (Fe) concentration. In some embodiments, there may be less than 25 ppm Fe, or in some embodiments the Fe concentration may be about 20 ppm or less. In various embodiments, the thermal conductivity of the glass sheet 28 may be greater than 0.5 watts/meter/Kelvin (W/m/K), for example in a range from about 0.5 to about 0.8 W/m/K. In additional embodiments, glass sheet 28 can be formed by a float glass process, a fusion draw process, a slot draw process, a redraw process, or another suitable glass sheet forming process.

In some embodiments, glass sheet 28 comprises $SiO_2$ in a range from about 65.79 mol % to about 78.17 mol %, $Al_2O_3$ in a range from about 2.94 mol % to about 12.12 mol %, $B_2O_3$ in a range from 0 mol % to about 11.16 mol %, $Li_2O$ in a range from 0 mol % to about 2.06 mol %, $Na_2O$ in a range from about 3.52 mol % to about 13.25 mol %, $K_2O$ in a range from 0 mol % to about 4.83 mol %, ZnO in a range from 0 mol % to about 3.01 mol %, MgO in a range from about 0 mol % to about 8.72 mol %, CaO in a range from about 0 mol % to about 4.24 mol %, SrO in a range from about 0 mol % to about 6.17 mol %, BaO in a range from about 0 mol % to about 4.3 mol %, and $SnO_2$ in a range from about 0.07 mol % to about 0.11 mol %. In some embodiments, the glass sheet can exhibit a color shift less than about 0.008, for example less than about 0.005. In some embodiments, the glass sheet comprises an $R_xO/Al_2O_3$ in a range from about 0.95 to about 3.23, wherein R is any one or more of Li, Na, K, Rb and Cs, and x is 2. In some embodiments, the glass sheet comprises an $R_xO/Al_2O_3$ ratio between 1.18 and 5.68, wherein R is any one or more of Li, Na, K, Rb, Cs and x is 2, or Zn, Mg, Ca, Sr or Ba and x is 1. In some embodiments, the glass sheet comprises an $R_xO-Al_2O_3-$ MgO in a range from about −4.25 to about 4.0, wherein R is any one or more of Li, Na, K, Rb and Cs, and x is 2.

In further embodiments, the glass sheet may comprise ZnO in a range from about 0.1 mol % to about 3.0 mol %, $TiO_2$ in a range from about 0.1 mol % to about 1.0 mol %, $V_2O_3$ in a range from about 0.1 mol % to about 1.0 mol %, $Nb_2O_5$ in a range from about 0.1 mol % to about 1.0 mol %, MnO in a range from about 0.1 mol % to about 1.0 mol %, $ZrO_2$ in a range from about 0.1 mol % to about 1.0 mol %, $As_2O_3$ in a range from about 0.1 mol % to about 1.0 mol %, $SnO_2$ in a range from about 0.1 mol % to about 1.0 mol %, $MoO_3$ in a range from about 0.1 mol % to about 1.0 mol %, $Sb_2O_3$ in a range from about 0.1 mol % to about 1.0 mol %, or $CeO_2$ in a range from about 0.1 mol % to about 1.0 mol %. In additional embodiments, the glass sheet may comprise between 0.1 mol % to no more than about 3.0 mol % of one or a combination of any of ZnO, $TiO_2$, $V_2O_3$, $Nb_2O_5$, MnO, $ZrO_2$, $As_2O_3$, $SnO_2$, $MoO_3$, $Sb_2O_3$, and $CeO_2$.

In some embodiments, the glass sheet comprises a strain temperature in a range from about 522° C. to about 590° C. In some embodiments, the glass sheet comprises an annealing temperature in a range from about 566° C. to about 641° C. In some embodiments, the glass sheet comprises a softening temperature in a range from about 800° C. to about 914° C. In some embodiments, the glass sheet comprises a CTE in a range from about $49.6 \times 10^{-7}$/° C. to about $80 \times 10^{-7}$/° C. In some embodiments, the glass sheet comprises a density between about 2.34 grams/cubic centimeter (g/cm) @ 20° C. and about 2.53 g/cc @ 20° C. In some embodiments, the glass sheet comprises less than 1 ppm each of Co, Ni, and Cr. In some embodiments, the concentration of Fe is less than about 50 ppm, less than about 20 ppm, or less than about 10 ppm. In some embodiments, Fe+30Cr+35Ni is equal to or less than about 60 ppm, equal to or less than about 40 ppm, equal to or less than about 20 ppm, or equal to or less than about 10 ppm. In some embodiments, a transmittance of the glass sheet at 450 nm over a distance of at least 500 mm can be greater than or equal to 85%, the transmittance at 550 nm over a distance of at least 500 mm can be greater than or equal to 90%, or the transmittance at 630 nm over a distance of at least 500 mm can be greater than or equal to 85%. In some embodiments, the glass sheet can be a chemically strengthened glass sheet, although in further embodiments, the glass sheet can be thermally strengthened or mechanically strengthened. For example, in some embodiments, the glass sheet can be a laminated glass sheet comprising a core glass and at least one clad glass layer disposed on the core glass, wherein a CTE of the clad glass is different than the CTE of the clad glass.

It should be understood, however, that embodiments described herein are not limited by glass composition, and the foregoing compositional embodiments are not limiting in that regard.

In accordance with embodiments described herein, BLU 24 further comprises an array of light emitting diodes (LEDs) 36 arranged along at least one edge surface (a light injection edge surface) of glass sheet 28, for example edge surface 34a. It should be noted that while the embodiment depicted in FIG. 1 shows a single edge surface 34a injected with light by LEDs 36, the claimed subject matter should not be so limited, as any one or more of the edges of an exemplary glass sheet 28 can be injected with light by LEDs 36. For example, in some embodiments, the edge surface 34a and its opposing edge surface 34c can both be injected with light by LEDs 36. Additional embodiments may inject light at edge surface 34b and its opposing edge surface 34d rather than, or in addition to, the edge surface 34a and/or its opposing edge surface 34c. The light injection surface(s) may be configured to scatter light within an angle less than 12.8 degrees full width half maximum (FWHM) in transmission.

In some embodiments, LEDs 36 may be located a distance d from the light injection edge surface, e.g., edge surface 34a, of less than about 0.5 mm. According to one or more embodiments, LEDs 36 may comprise a thickness (height) less than or equal to thickness T of glass sheet 28 to provide efficient light coupling into the glass sheet.

Light emitted by the array of LEDs is injected through the at least one edge surface 34a and guided through the glass sheet by total internal reflection, and extracted to illuminate LCD panel 12, for example by extraction features on one or both major surfaces 30, 32 of glass sheet 28, or within the bulk (body) of the glass sheet. Such extraction features disrupt the total internal reflection and cause light propagating within glass sheet 28 to be directed out of the glass sheet through one or both of major surfaces 30, 32. Accordingly, BLU 24 may further include a reflector plate 38 positioned behind LGP 26, opposite LCD panel 12, to redirect light extracted from the back side of glass sheet 28, e.g., major surface 32, to a forward direction through first major surface 30 and toward LCD panel 12. Suitable light extraction features can include a roughened surface on the glass sheet, produced either by roughening a surface of the glass sheet directly, or by coating the sheet with a suitable coating, for example a diffusion film. Light extraction features in some embodiments can be obtained, for example, by printing reflective features (e.g., white dots) with a suitable ink, such as a UV-curable ink and drying and/or curing the ink. In some embodiments, combinations of the foregoing extraction features may be used, or other extraction features as are known in the art may be employed.

BLU may, in some embodiments, further include one or more films or coatings (not shown) deposited on a major surface of glass sheet 28, for example a quantum dot film, a diffusing film, a reflective polarizing film, or a combination thereof.

Local dimming, e.g., one dimensional (1D) dimming, can be accomplished by turning on selected LEDs 36 illuminating a first region along the at least one edge surface 34a of glass sheet 28, while other LEDs 36 illuminating adjacent regions are turned off. Conversely, 1D local dimming can be accomplished by turning off selected LEDs illuminating the first region, while LEDs illuminating adjacent regions are turned on, or vice versa. FIG. 2 shows a portion of an exemplary LGP 26 comprising a first sub-array 40a of LEDs 36 arranged along edge surface 34a of glass sheet 28, a second sub-array 40b of LEDs 36 arranged along edge surface 34a of glass sheet 28, and a third sub-array 40c of LEDs 36 arranged along edge surface 34a of glass sheet 28. Three distinct regions of the glass sheet illuminated by the three sub-arrays are labeled A, B and C, wherein the A region is the middle region, and the B and C regions are adjacent the A region. Regions A, B and C are illuminated by LED sub-arrays 40a, 40b and 40c, respectively. With the LEDs of sub-array 40a in the "on" state and all other LEDs of other sub-arrays, for example the sub-arrays 40b and 40c, in the "off" state, a local dimming index LDI can be defined as 1−[(average luminosity of the B, C regions)/(luminosity of the A region)]. A fuller explanation of determining LDI can be found, for example, in "Local Dimming Design and Optimization for Edge-Type LED Backlight Unit": Jung, et al., SID 2011 Digest, 2011, pp. 1430-1432, the content of which is incorporated herein by reference in its entirety. It should be noted that the number of LEDs within any one array or sub-array, or even the number of sub-arrays, is at least a function of the size of the display device, and that the number of LEDs, arrays, and zones depicted in FIG. 2 are for illustration only and not intended as limiting. Accordingly, each sub-array can include a single LED, or more than one LED, or a plurality of sub-arrays can be provided in a number as necessary to illuminate a particular LCD panel, such as three sub-arrays, four sub-arrays, five sub-arrays, and so forth. For example, a typical 1D local dimming-capable 55 inch (139.7 cm) LCD TV may have 8 to 12 zones, each zone illuminated by one or more sub-arrays of LEDs comprising one or more LEDs. The zone width is typically in a range from about 100 mm to about 150 mm, although in some embodiments the zone width can be smaller. The zone length is about the same as a length of glass sheet 28. It is a basic tenant of 1D dimming that light injected into one zone of the LGP is confined as much as possible within that zone. An inability to adequately confine the injected light within the appropriate zone(s) can result in light bleeding into a zone that should be dimmed. Thus, a zone that is intended to be dark is instead lighted, and picture quality (e.g., contrast) suffers.

Figure 3A:
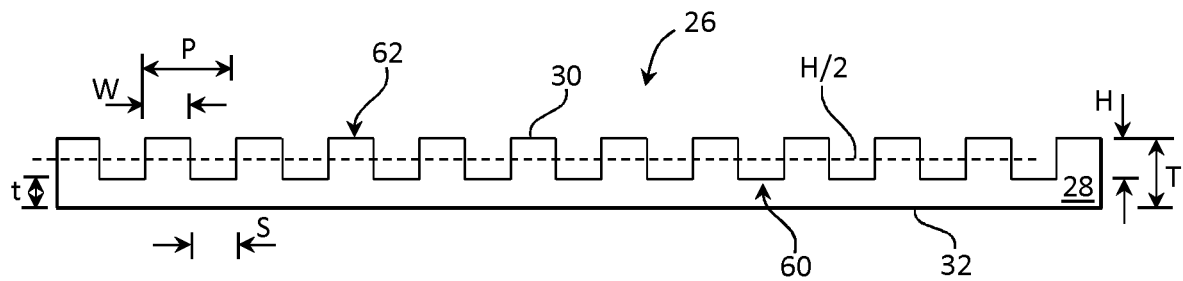
FIG. 3A is a cross sectional view of a glass sheet comprising a plurality of channels in a surface thereof and suitable for use with the glass light guide plate of FIG. 2.
Figure 3B:
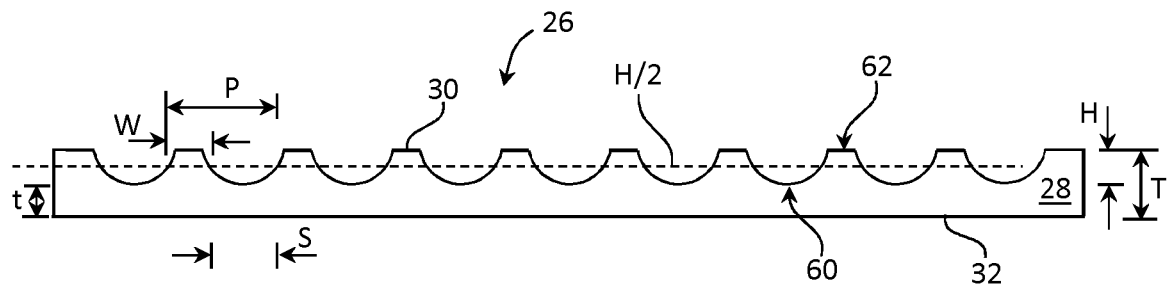
FIG. 3B is a cross sectional view of another glass sheet comprising a plurality of channels in a surface thereof and suitable for use with the glass light guide plate of FIG. 2.
Figure 3C:
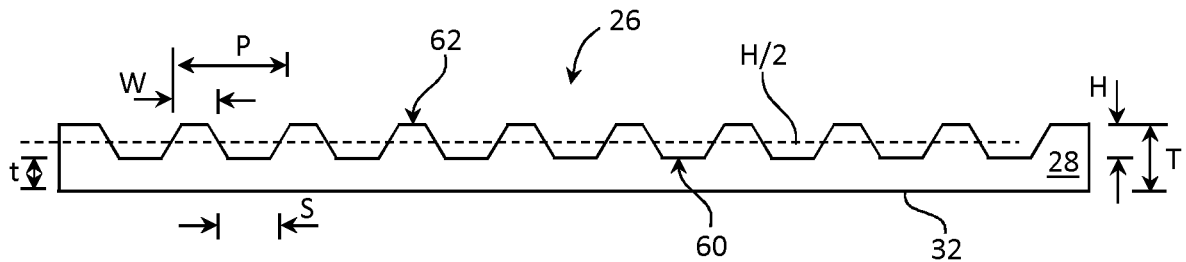
FIG. 3C is a cross sectional view of still another glass sheet comprising a plurality of channels in a surface thereof and suitable for use with the glass light guide plate of FIG. 2.

Referring now to FIG. 3A-3C, glass sheet 28 may be processed to include a structured surface to better confine light injected into a particular zone tom stay within that zone. As used herein, the term "structured surface", unless otherwise specified, refers to a surface comprising a plurality of structures, i.e., a plurality of alternating peaks and valleys (channels). A "peak", as used herein, can include a flat surface, an arcuate surface, or an angular surface, for example a prismatic surface, and is not restricted to a sharp point or ridge. The alternating peaks and channels are typically arranged in rows, for example parallel rows. The rows of peaks and channels, when viewed in cross section perpendicular to a length direction of the rows, may have the appearance of a waveform of various shapes. For example, a cross sectional view of these peaks and channels may have the appearance of a rectangular waveform, a triangular waveform, an arcuate waveform (for example a sinusoidal waveform), a trapezoidal waveform, and so forth, including combinations of the foregoing, as will become more clear in further descriptions.

FIGS. 3A-3C illustrate an LGP comprising glass sheet 28 including a plurality of channels 60 formed in a surface of the glass sheet, for example first major surface 30, the channels separated by and alternating with peaks 62, which, in the embodiment of FIG. 3A, are plateaus or mesas, although in further embodiments, the peaks can have different shapes. In some embodiments, the plurality of channels may be formed in second surface 32, or both first and second surfaces 30, 32 as discussed more broadly below. In embodiments, channels of the plurality of channels can be formed parallel to an adjacent peak of the plurality of peaks, and comprise a maximum depth H relative to the surface in which the channels are formed (e.g., first surface 30). Channels 60 further include a width S defined at a location across the channel at one half the depth H (i.e., H/2), designated by a dashed line in FIG. 3A-3C. The reference letter "t" represents a minimum thickness of glass sheet 28, which, for a glass sheet with only one structured surface, is the distance from the lowest point of a channel to the opposite, major surface, e.g., major surface 32.

Figure 4A:
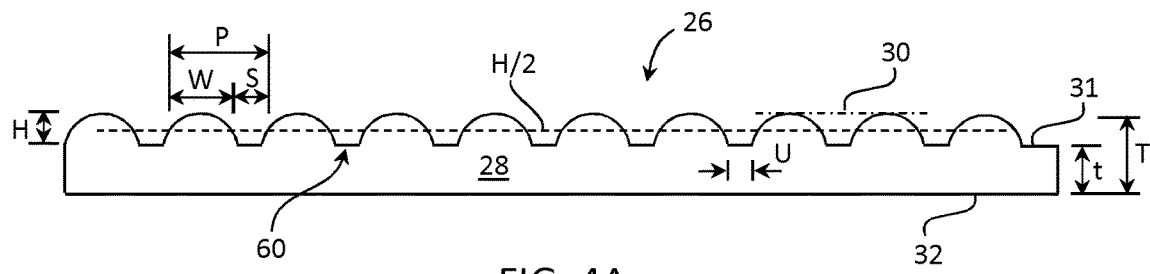
FIG. 4A is a cross sectional view of another glass sheet comprising a plurality of peaks in a surface thereof, the peaks separated by channels, and suitable for use with the glass light guide plate of FIG. 2.
Figure 4B:
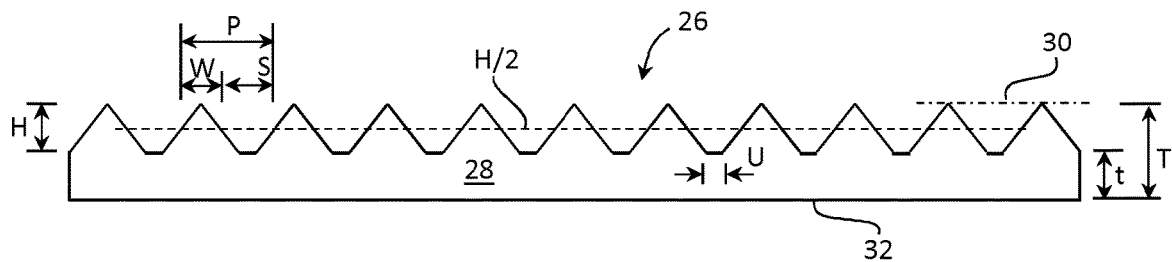
FIG. 4B is a cross sectional view of still another glass sheet comprising a plurality of peaks separated by channels in a surface thereof, the peaks separated by channels, and suitable for use with the glass light guide plate of FIG. 2.
Figure 4C:
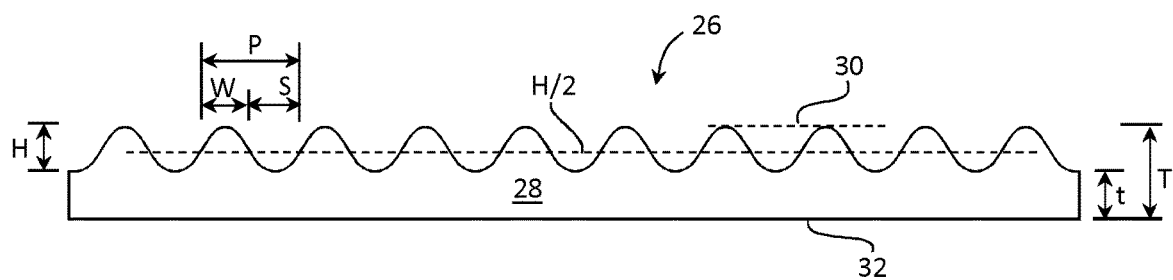
FIG. 4C is a cross sectional view of yet another glass sheet comprising a plurality of peaks separated by channels in a surface thereof, and suitable for use with the glass light guide plate of FIG. 2.

Referring now to FIGS. 4A-4C, in other embodiments, glass sheet 28 may be processed to include still other shapes of peaks and channels. For example, FIG. 4A illustrates arcuate peaks, such as circular arcs (e.g., semicircular arcs) separated by channels 60, wherein as before, the width W of each peak and the width S of each channel is defined at H/2 and a period of the channels and peaks is the sum of W and S (i.e., P=W+S). FIG. 4B illustrates a structured surface of a glass sheet comprising angular (prismatic) peaks, and FIG. 4C depicts a structured surface of a glass sheet 28 comprising a wavy surface with an array of alternating arcuate peaks and arcuate channels. In some embodiments, the structured surface may comprise a sinusoidal surface. It should be noted that discrete peaks (compared to continuous "waveforms, such as sinusoidal) can be separated by a gap U, which represents the distance between the bases of the peak. Such gaps are typically formed by a flat bottom surface (floor) substantially parallel with a plane of the glass sheet (e.g., a plane of an unstructured surface such as second major surface 32).

Figure 5A:
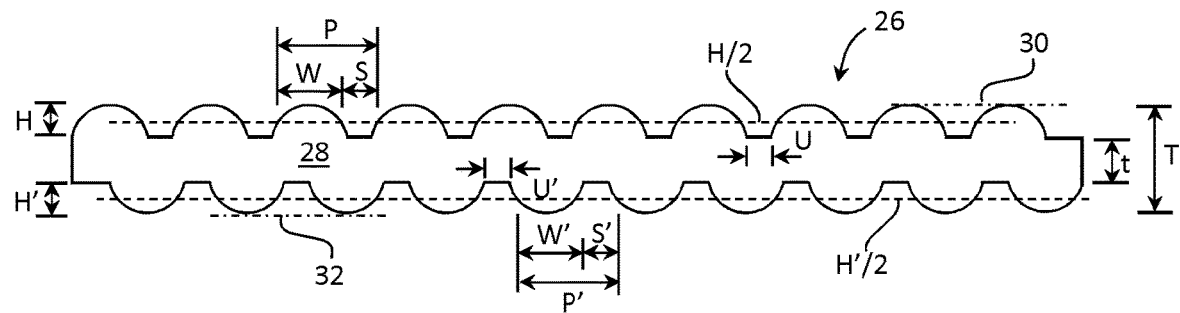
FIG. 5A is a cross sectional view of another glass sheet comprising a plurality of peaks separated by channels in both major surfaces thereof, and suitable for use with the glass light guide plate of FIG. 2.
Figure 5B:
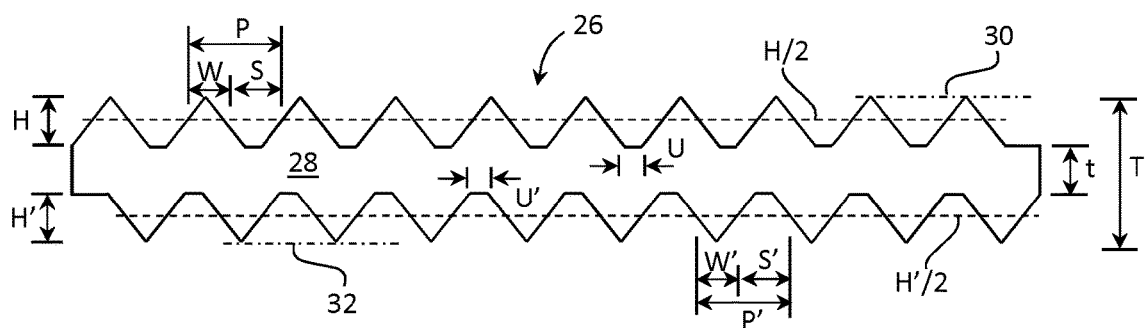
FIG. 5B is a cross sectional view of still another glass sheet comprising a plurality of peaks separated by channels in both major surfaces thereof, and suitable for use with the glass light guide plate of FIG. 2.
Figure 5C:
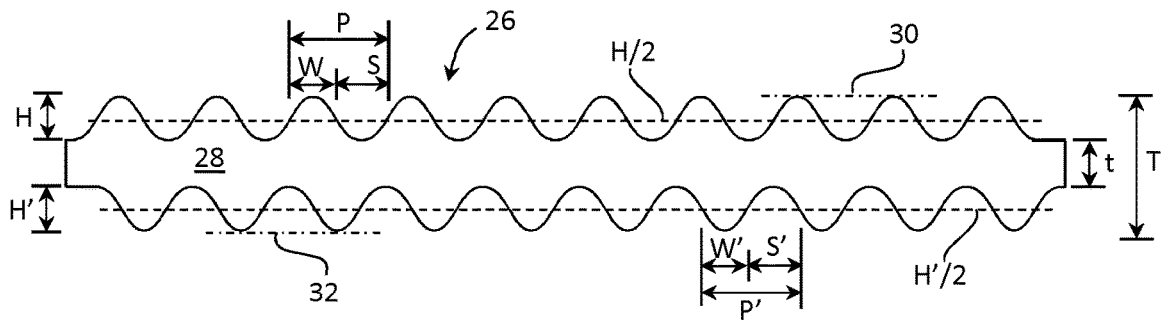
FIG. 5C is a cross sectional view of yet another glass sheet comprising a plurality of peaks separated by channels in both major surfaces thereof, and suitable for use with the glass light guide plate of FIG. 2.

In some embodiments, both major surfaces of glass sheet 28 may be a structured surfaces comprising a plurality of alternating rows of peaks and channels, as illustrated in FIGS. 5A-5C, wherein the opposite surface peak widths and channel widths are designated W' and S', respectively, and the period of the opposite surface peaks and channels is P'=W'+S'. It should be apparent that minimum thickness t for two opposing structured surfaces is defined between the lowest point of the channels on both surfaces of glass sheet 28 and the maximum thickness is defined between the highest points on both major surfaces of the glass sheet.

Channel depth H (or H'), as disclosed herein, can be in a range from equal to or greater than about 5 µm to about 300 µm, for example in a range from about 5 µm to about 250 µm, in a range from about 5 µm to about 200 µm, in a range from about 5 µm to about 150 µm, in a range from about 5 µm to about 100 µm, in a range from about 5 µm to about 80 µm, in a range from about 5 µm to about 70 µm, in a range from about 5 µm to about 60 µm, in a range from about 5 µm to about 50 µm, in a range from about 5 µm to about 45 µm, in a range from about 5 µm to about 40 µm, in a range from about 5 µm to about 35 µm, in a range from about 5 µm to about 30 µm, in a range from about 5 µm to about 25 µm, in a range from about 5 µm to about 20 µm, in a range from about 5 µm to about 15 µm, in a range from about 10 µm to about 300 µm, in a range from about 20 µm to about 300 µm, in a range from about 30 µm to about 300 µm, in a range from about 40 µm to about 300 µm, in a range from about 50 µm to about 300 µm, in a range from about 60 µm to about 300 µm, in a range from about 70 µm to about 300 µm, in a range from about 80 µm to about 300 µm, in a range from about 90 µm to about 300 µm, in a range from about 100 µm to about 300 µm, in a range from about 150 µm to about 300 µm, in a range from about 200 µm to about 300 µm, or in a range from about 250 µm to about 300 µm, although other depths are also contemplated depending on the maximum thickness T of the glass sheet and the cross sectional shape of the channels, including all subranges of the foregoing ranges. It should be readily apparent that channel depth is equal to peak height. Indeed, a peak is defined by the adjacent channels, and vice versa. Accordingly, H may be used herein to designate either channel depth or peak height, and the usage shall be readily apparent from the context.

In some embodiments, channel width S, defined at H/2, can be in a range from about 10 µm to about 3 mm, for example in a range from about 10 µm to about 2 mm, in a range from about 10 µm to about 1 mm, in a range from about 10 µm to about 500 µm, in a range from about 10 µm to about 300 µm, in a range from about 10 µm to about 100 µm, in a range from about 10 µm to about 50 µm, in a range from about 80 µm to about 300 µm, in a range from about 120 µm to about 300 µm, in a range from about 140 µm to about 300 µm, in a range from about 160 µm to about 300 µm, in a range from about 180 µm to about 300 µm, in a range from about 220 µm to about 300 µm, in a range from about 240 µm to about 300 µm, or in a range from about 260 µm to about 300 µm, including all subranges of the foregoing ranges, although other channel widths are also contemplated depending, for example, on the dimensions of the glass sheet, the cross sectional shape of the channels, and the number of desired lighting zones.

A ratio of channel width S to channel depth H (S/H) of a channel 60, for example at least one channel of the plurality of channels, or each channel of the plurality of channels, can range from about 1 to about 15, for example in a range from about 1 to about 12, in a range from about 1 to about 10, in a range from about 1 to about 8, in a range from about 1 to about 6, in a range from about 1 to about 4, in a range from about 2 to about 15, in a range from about 4 to about 15, in a range from about 6 to about 15, in a range from about 8 to about 15, in a range from about 10 to about 15, and in a range from about 12 to about 15, including all ranges and subranges therebetween.

Channels 60 and peaks 62 may in some embodiments be periodic, with a period P equal to the width W of a peak plus the width S of an adjacent channel, i.e., P=W+S, although in further embodiments, the channels and peaks may be non-periodic. That is, in some embodiments, the width of one channel on a surface of the glass sheet may be different than the width of another channel on the surface of the glass sheet. Similarly, the depth of one channel on the surface of the glass sheet may be different than the depth of another channel on the surface of the glass sheet. These differences extend also to the peaks, wherein the width of one peak on a surface of the glass sheet may be different than the width of another peak on the surface of the glass sheet. Similarly, the height of one peak on the surface of the glass sheet may be different than the height of another peak on the surface of the glass sheet.

Channels 60 may be of a variety of cross sectional shapes. For example, in the embodiment of FIG. 3A, channels 60 are of a step shape in a cross section perpendicular to a longitudinal axis of each channel (reminiscent of a rectangular, e.g., square, waveform). In the embodiment of FIG. 3B, each channel 60 comprises an arcuate cross sectional shape, for example a concave circular section, such as a circular arc, with intervening flat topped peaks (e.g., mesas), such that the structured surface of the glass sheet comprises alternating rows of mesas and arcuate channels. In the embodiment of FIG. 3C, each channel 60 comprises a trapezoidal shape with angled sidewalls relative to a flat bottom (floor) of the channel. However, the cross sectional shapes of FIGS. 3A-3C are not limiting, and channels 60 may have other cross sectional shapes, or combination of cross sectional shapes, including cross sectional shapes as described herein below. Indeed, in further embodiments, a structured surface can have peaks and channels of mixed shapes, for example a mixture of arcuate shaped channels and angular shaped (e.g., trapezoidal) channels. Similarly, a structured surface can have a mixture of different peaks, for example a mixture of step, arcuate, and/or angular shaped peaks. This includes individual channels and/or peaks of different shapes, or wherein a single channel or peak comprises portions of different shapes. For example, a channel and/or peak can comprise a step portion and an arcuate portion.

Figure 6A:
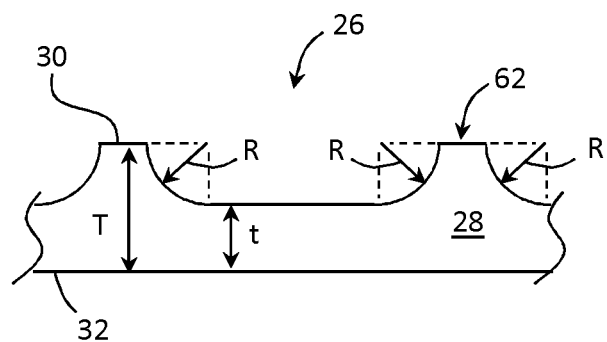
FIG. 6A is a cross sectional view of a channel formed in a major surface of a glass sheet, the channel comprising circular arc surfaces, the circular arc surfaces defining peaks 62.
Figure 6B:
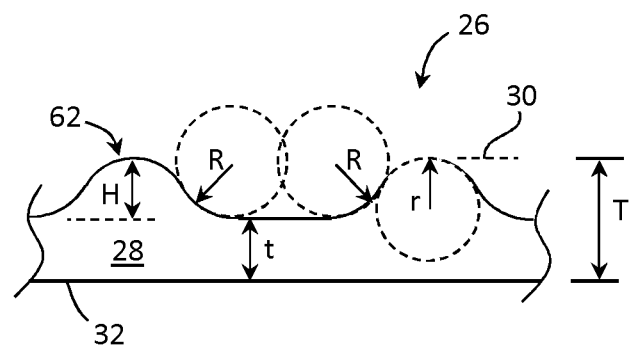
FIG. 6B is another cross sectional view of a channel formed in a major surface of a glass sheet, the channel comprising circular arc surfaces, the circular arc surfaces defining peaks 62 with arcuate upper surfaces.

Specific embodiments of circular arc channel cross sections are illustrated in FIGS. 6A and 6B. The embodiment of FIG. 6A is similar to the embodiment of FIG. 3B in that FIG. 6A depicts glass sheet 28 comprising channels 60 with a cross sectional shape including circular arcs adjacent each mesa-shaped peak 62. The circular arcs define the sidewalls of the peaks 62, and can have a radius of curvature in a range from about 0.5 µm to about 1 cm, for example in a range from about 0.5 µm to about 0.5 cm, in a range from about 0.5 µm to about 0.1 cm, in a range from about 0.5 µm to about 50 mm, in a range from about 0.5 µm to about 1 mm, in a range from about 0.5 µm to about 500 µm, in a range from about 0.5 µm to about 100 µm, in a range from about 0.5 µm to about 50 µm, or in a range from about 0.5 µm to about 5 µm.

FIG. 6B depicts another structured surface comprising arcuate section peaks 62 and channels 60 with arcuate sections. More particularly, the peaks 62 of FIG. 4B, in cross section, comprise circular arcs with a radius r, and the channel 60 therebetween comprises circular arcs with a radius R. In certain embodiments, radius r can be less than radius R. Each peak 62 is positioned between circular arcs with radius R and the side walls of the peaks are defined at least in part by the circular arcs with radius R. In the embodiments of FIG. 6A-6B, channel 60 comprises two circular arcs separated by a flat floor.

As described supra, a channel 60 of the plurality of channels is separated from an adjacent channel of the plurality of channels by a peak 62 corresponding to a high point between the two channels. For mesas in particular, the flat top between adjacent channels may, in some embodiments, correspond to the width of a local dimming zone for a backlight unit.

A width W of a peak, defined at H/2, can be, for example, equal to or greater than about 10 µm, equal to or greater than about 25 µm, equal to or greater than about 75 µm, equal to or greater than about 100 µm, equal to or greater than about 150 µm, equal to or greater than about 300 µm, equal to or greater than about 450 µm, equal to or greater than about 600 µm, equal to or greater than about 750 µm, equal to or greater than about 900 µm, equal to or greater than about 1200 µm, equal to or greater than about 1350 microns, equal to or greater than about 1500 µm, equal to or greater than about 1650 µm, equal to or greater than about 1800 µm, for example in a range from about 75 µm to about 1800 µm. In other embodiments, peak width W can be in a range from about 10 µm to about 3 mm, for example in a range from about 10 µm to about 2.5 mm, in a range from about 10 µm to about 2.0 mm, in a range from about 10 µm to about 1.5 mm, in a range from about 10 µm to about 1.0 mm, in a range from about 10 µm to about 800 µm, in a range from about 10 µm to about 500 µm, in a range from about 10 µm to about 300 µm, in a range from about 10 µm to about 200 µm, in a range from about 10 µm to about 100 µm, in a range from about 10 µm to about 80 µm, in a range from about 10 µm to about 50 µm, in a range from about 20 µm to about 800 µm, in a range from about 30 µm to about 500 µm, in a range from about 40 µm to about 300 µm, in a range from about 50 µm to about 250 µm, in a range from about 60 µm to about 200 µm, or in a range from about 70 µm to about 150 µm, including all ranges and subranges therebetween.

It should be readily apparent that peak height is equal to an adjacent channel depth. Accordingly, H may be used herein to designate either channel depth or peak height. Indeed, a peak is defined by the adjacent channels, and vice versa. The usage, whether peak or channel, shall be readily apparent from the context. In embodiments, peak height H can be in a range from equal to or greater than about 5 µm to about 300 µm, for example in a range from about 5 µm to about 250 µm, in a range from about 5 µm to about 200 µm, in a range from about 5 µm to about 150 µm, in a range from about 5 µm to about 100 µm, in a range from about 5 µm to about 80 µm, in a range from about 5 µm to about 70 µm, in a range from about 5 µm to about 60 µm, in a range from about 5 µm to about 50 µm, in a range from about 5 µm to about 45 µm, in a range from about 5 µm to about 40 µm, in a range from about 5 µm to about 35 µm, in a range from about 5 µm to about 30 µm, in a range from about 5 µm to about 25 µm, in a range from about 5 µm to about 20 µm, in a range from about 5 µm to about 15 µm, in a range from about 10 µm to about 300 µm, in a range from about 20 µm to about 300 µm, in a range from about 30 µm to about 300 µm, in a range from about 40 µm to about 300 µm, in a range from about 50 µm to about 300 µm, in a range from about 60 µm to about 300 µm, in a range from about 70 µm to about 300 µm, in a range from about 80 µm to about 300 µm, in a range from about 90 µm to about 300 µm, in a range from about 100 µm to about 300 µm, in a range from about 150 µm to about 300 µm, in a range from about 200 µm to about 300 µm, or in a range from about 250 µm to about 300 µm, although other peak heights are also contemplated depending on the maximum thickness T of the glass sheet. Where two opposing structured surfaces are illustrated, peak height shall be designated by H for one structured surface, and H' to signify and distinguish peak height for the opposing structured surface. Instances of H as used herein will be understood to include instances of H'.

In some embodiments, a ratio W/H of a peak 62 can range from about 1 to about 15, for example in a range from about 1 to about 12, in a range from about 1 to about 10, in a range from about 1 to about 8, in a range from about 1 to about 6, in a range from about 1 to about 4, in a range from about 2 to about 15, in a range from about 4 to about 15, in a range from about 6 to about 15, in a range from about 8 to about 15, in a range from about 10 to about 15, and in a range from about 12 to about 15, including all ranges and subranges therebetween.

For structured surfaces disclosed herein, in embodiments where only one major surface of the glass sheet 28 is a structured surface, channel width S can be less than about ten times the peak width W, e.g., $S \leq 10$ W, such as $S \leq 8$ W, $S \leq 6$ W, $S \leq 4$ W, $S \leq 2$ W, $S \leq W$, $S \leq 0.5$ W, $S \leq 0.3$ W, $S \leq 0.2$ W, for example in a range from about 0.2 to about 10, in a range from about 0.2 to about 8, in a range from about 0.2 to about 6, in a range from about 0.2 to about 4, in a range from about 0.2 to about 3, in a range from about 0.2 to about 2, in a range from about 0.2 to about 1, in a range from about 0.3 to about 10, in a range from about 0.4 to about 10, in a range from about 0.5 to about 10, in a range from about 1 to about 10, in a range from about 2 to about 10, in a range from about 4 to about 10, in a range from about 6 to about 10, or in a range from about 8 to about 10, including all ranges and subranges therebetween.

When the first and second major surfaces are both structured surfaces, the channel width S can be less than about twenty times the peak width W, e.g., $S \leq 20$ W, $S \leq 18$ W, $S \leq 16$ W, $S \leq 14$ W, $S \leq 12$ W, $S \leq 10$ W, $S \leq 8$ W, $S \leq 6$ W, $S \leq 4$ W, $S \leq 3$ W, $S \leq 2$ W, $S \leq W$, $S \leq 0.5$ W, $S \leq 0.3$ W, $S \leq 0.2$ W, for example in a range from about 0.2 to about 20, in a range from about 0.2 to about 18, in a range from about 0.2 to about 16, in a range from about 0.2 to about 14, in a range from about 0.2 to about 12, in a range from about 0.2 to about 10, in a range from about 0.2 to about 8, in a range from about 0.2 to about 6, in a range from about 0.2 to about 4, in a range from about 0.2 to about 3, in a range from about 0.2 to about 2, or in a range from about 0.2 to about 1, in a range from about 0.2 to about 20, in a range from about 0.3 to about 20, in a range from about 0.4 to about 20, in a range from about 0.5 to about 20, in a range from about 1 to about 20, in a range from about 2 to about 20, in a range from about 2 to about 20, in a range from about 6 to about 20, in a range from about 8 to about 20, in a range from about 10 to about 20, in a range from about 12 to about 20, in a range from about 14 to about 20, in a range from about 16 to about 20, or in a range from about 18 to about 20, including all ranges and subranges therebetween. (The foregoing ratios apply also to W' and S').

The channel depth H, alternatively peak height, can, in some embodiments, range from about 5% to about 90% of the glass sheet thickness T. For instance, for a glass sheet with channels formed on only one major surface, the channel depth H can range from about 10% to about 90% of the maximum glass sheet thickness T ($0.1 \leq H/T \leq 0.9$), such as $H/T \leq 0.9$, $H/T \leq 0.8$, $H/T \leq 0.7$, $H/T \leq 0.6$, $H/T \leq 0.5$, $H/T \leq 0.4$, $H/T \leq 0.3$, $H/T \leq 0.2$, or $H/T \leq 0.1$, including all ranges and subranges therebetween. For a glass sheet with channels formed on two opposing major surfaces, the channel depth H (or H' for the opposite surface) can range from about 5% to about 45% of the maximum glass sheet thickness T ($0.05 \leq H/T \leq 0.45$), such as $H/T \leq 0.45$, $H/T \leq 0.4$, $H/T \leq 0.35$, $H/T \leq 0.3$, $H/T \leq 0.25$, $H/T \leq 0.2$, $H/T \leq 0.15$, $H/T \leq 0.1$, or $H/T \leq 0.05$, including all ranges and subranges therebetween. It is to be understood that the foregoing ranges apply equally to both the ratio H/T as indicated and H'/T. Accordingly, channel depth H' can range from about 5% to about 45% of the maximum glass sheet thickness T ($0.05 \leq H'/T \leq 0.45$), such as $H'/T \leq 0.45$, $H'/T \leq 0.4$, $H'/T \leq 0.35$, $H'/T \leq 0.3$, $H'/T \leq 0.25$, $H'/T \leq 0.2$, $H'/T \leq 0.15$, $H'/T \leq 0.1$, or $H'/T \leq 0.05$, including all ranges and subranges therebetween. Moreover, as described supra, neither the channel depths H' nor channel widths S' of the second major surface need have the same magnitude as the channel depths H and channel widths S of the first major surface. Accordingly, H' can equal H, or H' can be different than H. Similarly, S' can equal S or S' can be different than S. In addition, opposing channels and/or peaks may be aligned, or, as depicted in FIG. 5A-5C, in other embodiments may not be aligned.

Figure 7A:
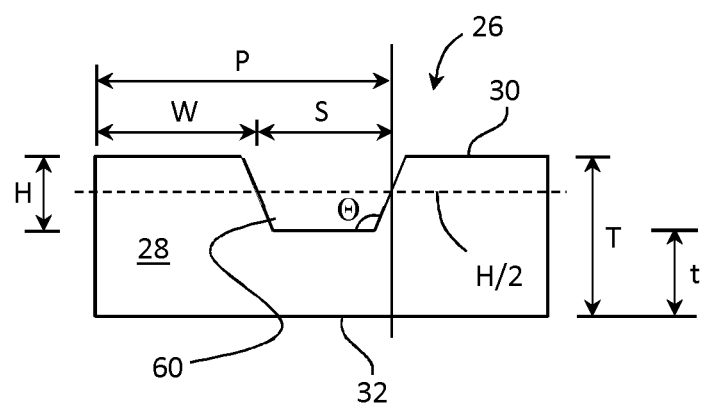
FIG. 7A is a cross sectional view of a trapezoidal channel formed in a major surface of a glass sheet.

As illustrated in FIG. 7A, a wall angle Θ between the bottom surface of a channel and an angled side wall of the channel, as can be found in a trapezoidal channel, can also be varied to achieve a desired local dimming effect. The wall angle Θ can range, for example, from greater than 90° to less than 180°, such as from about 95° to about 160°, from about 100° to about 150°, from about 110° to about 140°, or from about 120° to about 130°, including all ranges and subranges therebetween.

Figure 7B:
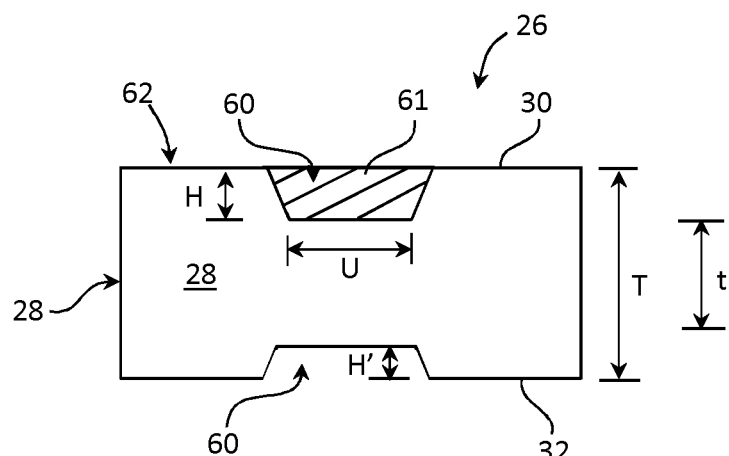
FIG. 7B is a cross sectional view of a trapezoidal channel formed in both major surfaces of a glass sheet.

In various embodiments, one or more channels 60 can be completely or partially filled with at least one low refractive index material 61, for example as shown in FIG. 7B. Low refractive index material 61 can be an optically transparent material with an index of refraction at least 10% lower than the index of refraction of the glass sheet. Exemplary low index of refraction materials can be selected from polymers, glasses, inorganic oxides, and other like materials. The low index of refraction material can be used to fill or at least partially fill channels 60 of any shape and/or size, including the embodiments depicted herein.

Channels 60 can be formed, for example, by etching, wherein portions of the first and/or second major surfaces 30, 32 are coated with a patterned acid resistant material, for example by printing (e.g., inkjet printing, screen printing), and those portions of first major surface 30 and/or second major surface 32 where glass material is to be removed are maintained free of the acid resistant material. The so-coated surface may then be exposed to a suitable acid solution (e.g., etchant) for a time and at a temperature suitable to etch the surface of the glass sheet and form channels with the desired depth H and width S, such as by dipping the glass sheet into the acid solution or by spraying the etchant on the glass sheet. In embodiments where only a single major surface of the glass sheet is etched, the opposite major surface may be covered entirely with acid resistant material. Additionally, the edge surfaces of the glass sheet may also be coated with acid resistant material to prevent etching of the edge surfaces. In some embodiments, when the glass sheet is very thin, for example when T is equal to or less than about 0.3 mm, the glass sheet may be attached to a carrier plate, for example a thicker glass plate, or a plate of another suitable material, using methods known in the art. For example, glass sheet 28 may be attached to a carrier plate with an adhesive.

The etching solution may include, for example any one or more of HF, $H_2SO_4$, HCl, including combinations thereof. The etching method may, in certain embodiments, be applicable to glass compositions having a viscosity η and a Young's modulus of elasticity E, wherein $η/E < 0.5$ seconds. Etching methods can be used to create any of the channels 60 described herein.

Figure 8A:
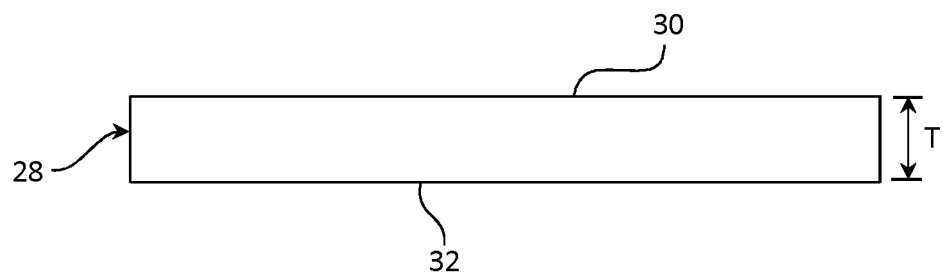
FIG. 8A is a cross sectional view of a glass sheet prior to deposition of an etch mask.

Methods of etching a major surface of a glass sheet typically begin with a clean sheet of glass, as dust, oils or other contaminants can negatively impact the etching process by preventing uniform etching. Accordingly, in an exemplary etching process, a glass sheet 28 (see FIG. 8A) to be etched may be cleaned using a washing liquid, for example water, and optionally a detergent, to remove contamination, then rinsed with water sufficiently to remove detergent residue. In one example, the glass sheet can be initially washed with a KOH solution to remove organic contaminants and dust on the glass surface. Other washing solutions may be substituted as needed. A level of cleanliness sufficient to obtain a water contact angle of less than about 20° C. should be attained. Contact angle can be evaluated, for example, using a DSA100 drop shape analyzer manufactured by Krüss GmbH and employing a sessile drop method. After cleaning, the glass sheet may optionally be rinsed, for example with deionized water. Additionally, the surface to be etched may be plasma treated using an air plasma to remove any organic contaminants on the surface of the glass sheet after washing. For example, the glass sheet surface may be exposed to an air plasma (50 watts) for a time in a range from about 2 minutes to about 4 minutes, although other times may be used depending on the level of cleanliness desired and the initial cleanliness of the glass sheet. Alternatively, or in addition, the glass sheet can be dried to remove any physisorbed water from the glass surface. Interfacial surface-adsorbed (physisorbed) water can significantly influence adhesion of the etch mask to the glass surface during subsequent etching, including both bath etching and spray etching. For example, the glass sheet can be baked in an oven at a temperature equal to or greater than about 200° C., for example in a range from about 200° C. to about 250° C. for a period of at least about 16 hours, for example in a range from about 16 hours to about 20 hours. Upon removal from the oven, the glass sheet can be stored in a desiccator at a relative humidity in a range from about 40% to about 60% prior to subsequent processing to prevent re-absorption of moisture.

Figure 8B:
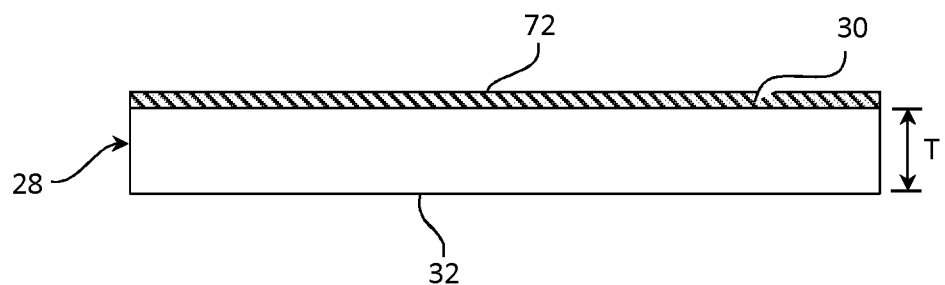
FIG. 8B is a cross sectional view of the glass sheet of FIG. 8A comprising an optional adhesion promoter layer deposited thereon.

The method may further comprise an optional step of applying an adhesion promoter to the surface of the glass sheet to be etched prior to application of an etch mask material. For example, FIG. 8B illustrates an adhesion promoter layer 72 applied to first major surface 30 of glass sheet 28, although in further embodiments, both first major surface 30 and second major surface 32 may be coated with the adhesion promoter if the etch mask 74 is to be applied to both major surfaces of the glass sheet. The adhesion promoter can be used to ensure adequate adhesion of the acid resistant (resist) material. The adhesion promoter can be a silane layer, an epoxysilane layer or a self-assembled siloxane layer. The adhesion promoter, can, for example, comprise HardSil™ AM (HAM), an acrylate-based polysilsesquioxane resin solution manufactured by Gelest Incorporated, diluted with 2 methoxy propanol. In some embodiments, the adhesion promoter may be a HAM polysilsesquioxane stock solution diluted to 10% to 50% by volume using 2-methoxy propanol. The HAM solution may be diluted to a polymer concentration of 2% to 10% by volume. Other adhesion promoters suitable for use include octadecyldimethyl(3-trimethoxylsilylpropyl)ammoniumchloride in water and/or acetic acid 3-glycidyoxypropyl) trimethoxysilane in isopropyl alcohol.

In some embodiments, the adhesion promoter may be applied by painting (rolling). However, in other embodiments, the adhesion promoter may be applied by spin coating or dipping. For example, spin coating can be performed at multiple speeds, such as a first, slow rotational speed, for example in a range from about 500 to about 1000 rpm, followed by a second, faster rotational speed, such as in a range from about 2500 rpm to about 3500 rpm. Surface energy and atomic force surface roughness measurements have shown that a solution of >10% HAM resulted in a well-coated surface. However, it should be noted that in some embodiments, an adhesion promoter may not be necessary if the selected acid resist material applied to the glass exhibits adequate adhesion.

After application of the adhesion promoter layer, the adhesion promoter can be optionally air dried, and cured by baking, for example at a temperature of about 120° C. to about 300° C., for example in a range from about 150° C. to 200° C., depending on material, for a time in a range from about 5 minutes to 1 hour, for example 20 minutes to about 30 minutes. The coated glass sheet can then be rinsed, for example in isopropyl alcohol, and then blown dry with nitrogen gas ($N_2$).

Figure 8C:
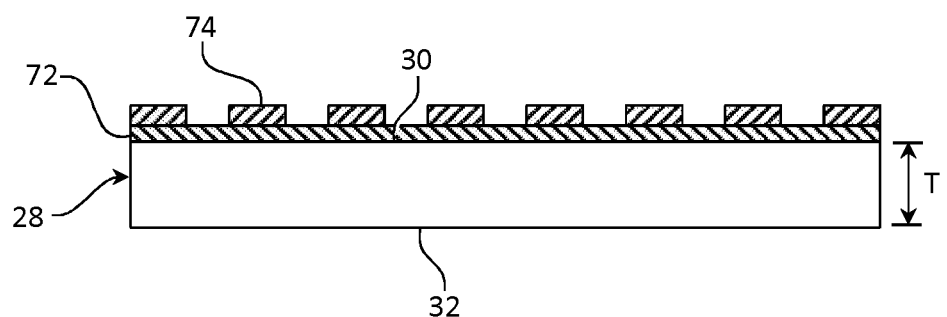
FIG. 8C is a cross sectional view of the glass sheet of FIG. 8B comprising an etch mask deposited thereon.
Figure 8D:
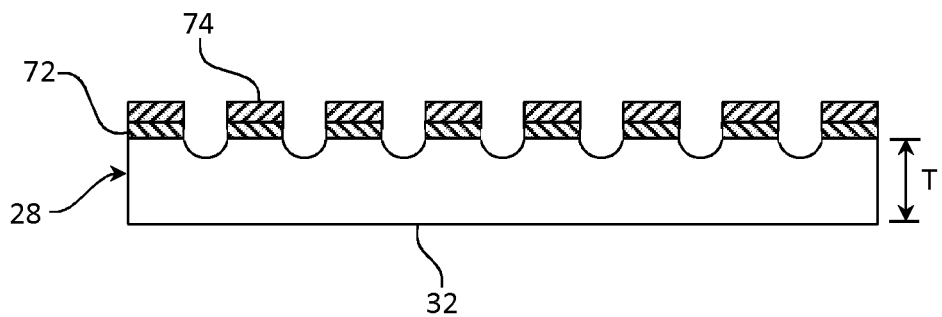
FIG. 8D is a cross sectional view of the glass sheet of FIG. 8C after etching.

In a subsequent step, shown in FIG. 8C, an acid resist material, or etch mask 74, is applied to the glass sheet, over the adhesion promoter if present, with a desired pattern, noting that portions of the glass major surface (e.g., adhesion promoter) covered with the resist material will be un-etched during the etching process and form peaks 62 after etching and the etch mask is removed. The applied pattern of the etch mask can be a plurality of rows, for example a plurality of parallel rows, extending across a major surface of glass sheet 28, although other patterns are possible. Those portions of the glass sheet not covered with the resist material will be etched below the level of the exposed surface, forming channels. As previously described, the acid resist material can be applied by a printing process, for example screen printing or inkjet printing. It should also be noted that the pattern resolution, that is, the size (e.g., width) and spatial density (e.g., periodicity) of the peaks and channels remaining after etching involves as a minimum controlling the amount of undercutting that occurs during the etching process, as will be described below.

Typical screen mesh sizes for a screen printing process can be in a range from about 300 to 500 wires per square inch (46.5 to 77.5 wires per square centimeter), the screen wires formed of stainless steel. A photo-sensitive emulsion (photoresist) is applied evenly to the screen to a depth in a range from about 5 μm to about 10 μm, for example in a range from about 5 μm to about 9 μm, such as 7 μm, and cured by illuminating the emulsion with light, such as ultraviolet light, through a photomask comprising a negative of the pattern for the etch mask, alternating transparent and opaque rows. The screen and photoresist are washed after exposure, removing the uncured portions of the photoresist and leaving strips of cured emulsion, thereby producing a patterned screen.

A screen printed etch mask is applied by suspending the patterned screen over the glass sheet surface, flooding the screen with etch mask material, and wiping the screen with a squeegee. The screen may be suspended a distance from the glass surface in a range from about 2 mm to about 5 mm, for example in a range from about 4 mm to about 5 mm. the squeegee should be wiped across the patterned screen at a substantially constant speed and pressure to apply the etch mask material, for example at a speed in a range from about 75 mm/second to about 125 mm/second, such as in a range from about 90 mm/second to about 110 mm/second, and at a pressure in a range from about 27 pounds/$inch^2$ (0.186 megaPascal) to about 30 pounds/$inch^2$ (0.207 megaPascal). Once the etch mask material has been deposited on the surface of the glass sheet, the etch mask material is cured as appropriate for the material. For example, a thermally cured etch mask material may be cured by heating in an oven at a temperature in a range from about 120° C. to about 140° C., for example in a range from about 130° C. to about 140° C. and for a time in a range from about 5 minutes to about 75 minutes, although these conditions may vary depending on the selection of material. A UV curable etch mask material is cured with UV light. After curing, the glass sheet can be held in a desiccator until further processed.

In some embodiments, an adhesion promoter can be incorporated into the etch mask material rather than applied as a separate layer. Various etch mask materials can be selected with varying degrees of adhesion promoter incorporated into the material composition, or more simply by the degree of adhesion a particular etch mask material provides. The precise surface topology of all-glass surface-structured LGPs created by mask printing and etching methods depends strongly on the degree of adhesion of the etch mask to the substrate.

The etch mask material can be selected from a range of consistencies. In some embodiments the etch mask material can be applied as an ink. Suitable inks are typically multi component compositions containing an organic polymer, dispersants, emulsifiers, crosslinking agents, pigment, anti-oxidants, solvents, adhesion promoters and an inorganic material (e.g., filler material). Typical polymers include acrylate resins, epoxy resins, phenolic resins, and polysiloxanes. The glass sheet surface topology after etching is adjustable, in that a range of shapes, from varying degrees of arcuate (e.g., corrugated or sinusoidal) morphologies to varying degrees of "flat top" morphologies, can be obtained by varying etch mask adhesion to the glass surface. Various LGP optical parameters influencing optical performance, such as the light confinement index (LDI), can be impacted by the glass sheet surface topology. Example etch mask materials are Kiwomask 140 ("Kiwo"), available from Kiwo, Seabrook, Tex., USA CGSN XG77 ("CGSN") and ESTS 3000 ("ESTS"), both available from Sun Chemical. The etch mask material can be diluted as necessary to obtain a suitable viscosity. These example etch mask materials incorporate varying amounts of adhesion promoter, and yielded varying degrees of adhesion to the glass surface.

In some embodiments, the etch mask can comprise a thermoplastic material. Examples of suitable thermoplastic materials include ethylene vinyl acetate materials, propylene materials, polyol materials, polyamide materials, polyurethane materials, pluronic materials, polyacrylamides, and the like. Such thermoplastic materials can be manufactured without volatile media, thereby eliminating the need for a drying step after the thermoplastic material is applied to the surface of the glass sheet. Thermoplastic materials exhibit good adhesion to the glass surface, further eliminating the need for an adhesion promoting layer (or incorporating an adhesion promoter into the etch mask composition) and reducing or eliminating the potential for delamination during a subsequent etching step. However, the thermoplastic material should be selected to have a CTE substantially equal to the CTE of the glass. For example, the thermoplastic material should be selected to have a CTE within about 10% of the CTE of the glass to avoid possible delamination via CTE mismatch.

Although the thermoplastic material is applied to the glass surface in a low viscosity ("liquid") state, the thermoplastic material solidifies virtually instantly as it contacts the glass surface, eliminating spreading out ("wetting") of the deposited pattern and producing a clean, consistent, well-defined pattern on the glass surface with controllable shapes and spacing.

Application of the thermoplastic material can be accomplished, for example, by ejecting the thermoplastic material from one or more nozzles, e.g., heated nozzles. The one or more nozzles can be incorporated into an application head which itself is installed on a computer-driven application apparatus, for example a two or three dimensional gantry capable of moving the application head in at least two, preferably three dimensions. For example, the thermoplastic material can be applied with an ink jet printing process, such as or similar to readily commercially available apparatus for 3D printing of thermoplastic materials.

Alternatively, the thermoplastic material can be applied in a screen printing process wherein the thermoplastic material can be applied over a suitable mesh screen, for example a metallic (e.g., stainless steel) mesh screen, and heated via a furnace, microwave, infrared (IR) heaters, or laser(s), for example a $CO_2$ laser. The mesh screen is then pressed to the glass surface to transfer the thermoplastic material to the glass surface. In embodiments, portions of the application apparatus can be heated to maintain the thermoplastic material in a low viscosity state during the transfer. For example, the mesh screen can be configured to be direct heated by establishing an electric current in wires of the screen, wherein the electric current heats the mesh screen via resistance heating. The temperature of the mesh screen should be maintained at a temperature in a range from about 30° C. to about 150° C., depending on the selected thermoplastic material. Once the mesh screen is positioned over the glass, the thermoplastic material can be forced through the mesh screen using a heater, for example a heated plate, or by a squeegee, or the screen printing method can be employed using a rotary screen printing technique.

Advantageously, thermoplastic materials can be re-used, thereby allowing recovery and re-use of the thermoplastic material after a subsequent etching process. For example, the thermoplastic etch mask material can be removed with an appropriate solvent (depending on the thermoplastic), with hot water, or heating by other methods (e.g., IR heaters).

Figure 8E:
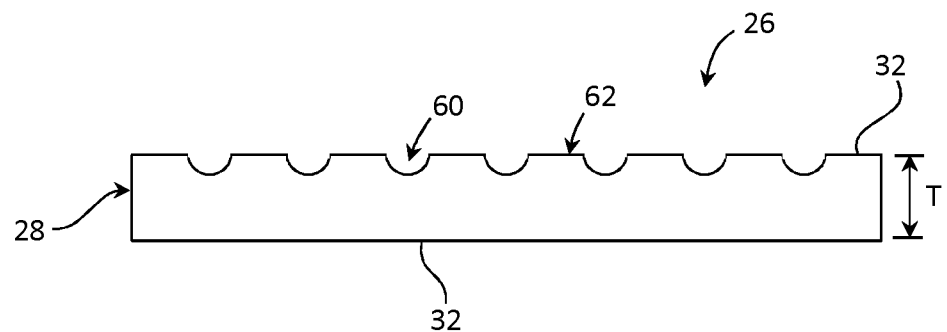
FIG. 8E is a cross sectional view of the glass sheet of FIG. 8D after removal of etch mask remaining after etching.

Whether the composition of the etch mask, once the etch mask is applied, glass is removed from the glass sheet to form channels 60 remaining etch mask (and adhesion promoter layer, if present), is then removed, leaving an LGP with rows of alternating channels 60 and peaks 62 (FIG. 8E). In some embodiments, glass is removed by exposing the glass sheet to an etchant (etching solution).

While high resolution screen printing favors stiff-walled mesh, such as those employed with stainless steel-based screens, the sidewall smoothness of the etched channels is also dependent on the interplay between the rheology of the visco-elastic screen ink during printing through the screen emulsion-pattern gaps, and the screen openings. The specific shear-thinning forces that manifest are related to the screen's squeegee velocity (e.g., 5 cm/s) and applied pressure (e.g., 3 psi, or 20.7 kiloPascals, above ambient), the screen-glass surface gap (e.g., 2 mm-5 mm), the emulsion thickness (e.g., 5 µm-30 µm), screen thickness, and string angle (0°-30°).

Figure 9:
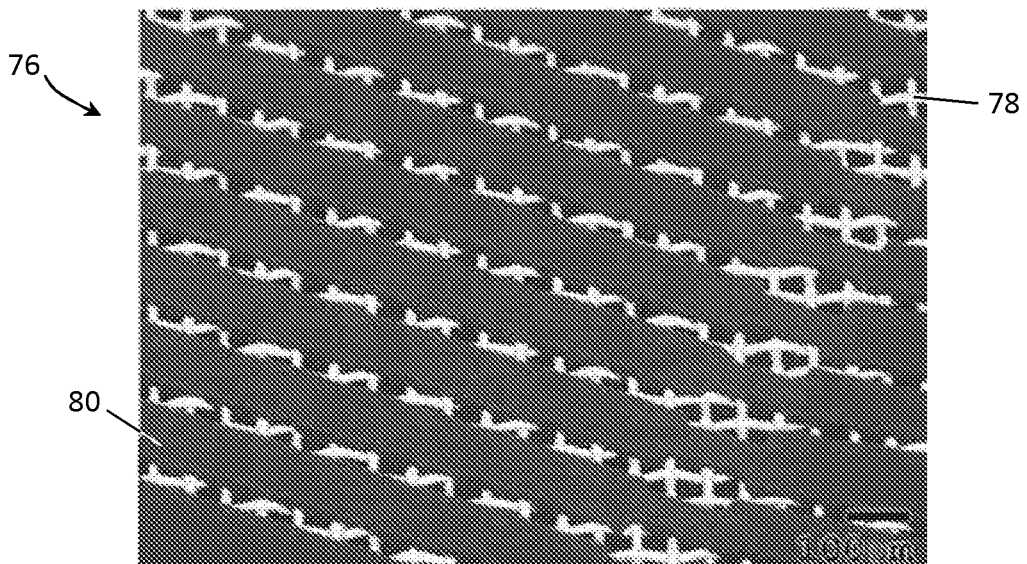
FIG. 9 is an SEM image of metal wire mesh for screen printing an etch mask, showing a cured emulsion pattern on the screen.

FIG. 9 is an SEM image (at 100× magnification) of a screen format that can be used to produce all-glass surface structured LGPs with high LDI values. The depicted patterned screen 76 comprises a stainless steel 360 mesh screen 78 with 56 µm openings, a string angle of 22°, and a 15 µm thick screen emulsion pattern with 150 µm wide strips 80. String angle refers to the angle of individual wires of the metal screen mesh relative to the edge of a cured emulsion row (strip 80) forming the patterned screen.

The screen mesh is angled relative to the cured emulsion strips so that when printing straight lines, the printing medium (e.g., etch mask material) does not follow along the edge of a screen wire ("string"). This can easily cause "line jumping", where the intended straight edge instead jumps back and forth over a screen wire (because the emulsion edge is running right along with it) and therefore does not print a straight line. While a 22.5° string angle was found to be a generally optimal string angle to help eliminate line jumping, other angles can also be beneficial depending on the etch mask material (e.g., mask material viscosity). For example, whereas in some instances 22.5° caused line printing issues, 30° worked well. In some embodiments, a string angle of 45° for straight line patterns caused printing issues, since the mask ink can fall where the wires cross over each other on a repeating pattern. However, other patterns favored string angles at 45°. Accordingly, string angle can be in a range from about 20° to about 45°, although other string angles may be acceptable.

To better understand the effect of etchant formulation on glass removal, twelve etching solutions were tested: a 10% HF-10% $HNO_3$ solution; a 10% HF-20% $HNO_3$ solution; a 10% HF-30% $HNO_3$ solution; a 10% HF-20% $H_2SO_4$ solution; a 10% HF-20% $H_2SO_4$ solution; a 10% HF-30% $H_2SO_4$ solution; a 10% HF-10% HCl solution; a 10% HF-20% HCl solution; a 10% HF-30% HCl solution; and an HF etching solution in three concentrations; 10%, 20% and 30% HF. Conditions and results of the etching are shown in Table 1 below. Etching was conducted with an etching solution temperature of 21° C. and an exposure time of 30 minutes. Table 1 presents, from left to right, the etching solution composition, the etchant temperature, the etch rate, whether haze was present after the etching, and the roughness of the un-etched major surface (back side) of the glass sheet. The data show that HF mixed with $H_2SO_4$ produced the fastest etch rate, which is desirable in a commercial process, although other solutions also produced acceptable results.

TABLE 1

| Etching Solution (30 minutes) | Temperature | Etch Rate (mm/min) | Haze | Roughness (back side) |
|---|---|---|---|---|
| 10% HF 10% $HNO_3$ | 21° C. | 0.37 | No | 1.29 nm +/− 0.6 (scratch may throw off) |
| 10% HF 20% $HNO_3$ | 21° C. | 0.59 | No | 1.725 nm +/− 1.2 (bumps throw off) |
| 10% HF 30% $HNO_3$ | 21° C. | 0.89 | No | 0.29 nm +/− 0.015 |
| 10% HF | 21° C. | 0.2 | No | 0.26 nm +/− 0.06 |
| 20% HF | 21° C. | 0.58 | No | 0.67 nm +/− 0.4 |
| 30% HF | 21° C. | 1.23 | No | 0.79 nm +/− 0.12 |
| 10% HF 10% $H_2SO_4$ | 21° C. | 0.503 | No | 2.0 nm +/− 0.57 |

TABLE 1-continued

| Etching Solution (30 minutes) | Temperature | Etch Rate (mm/min) | Haze | Roughness (back side) |
|---|---|---|---|---|
| 10% HF 20% $H_2SO_4$ | 21° C. | 1.41 | Possible striation | 2.0 +/− 0.57 |
| 10% HF 30% $H_2SO_4$ | 21° C. | 2.78 | Slight striation | 6.192 +/− 2.01 (bumps) |
| 10% HF 10% HCl | 21° C. | 0.34 | No | 2.5 +/− 0.8 |
| 10% HF 20% HCl | 21° C. | 0.497 | No | 8.7 +/− 6.1 (bumps) |
| 10% HF 30% HCl | 21° C. | 0.714 | No | 1.079 +/− 0.687 (bumps) |

While all the etchant formulations in Table 1 are capable of forming channels in glass substrate 28, the 10% HF-20% $H_2SO_4$ solution produced the fastest etch rate with minimal striations observable on the etched surface after the completion of etching, while the 10% HF-30% $H_2SO_4$ solution produced noticeable striations. These striations manifest as a wavy line-like residue on the etched glass surface. Channel height measurements were performed by white light interferometry using a Zygo instrument.

Subsequent testing showed that agitation (e.g., stirring at 400 rpm with "rice" stir bars) helped to minimize striations. Agitation was particularly effective at mitigating striations with the 10% HF-20% $HNO_3$ solution.

In accordance with Table 1, suitable etchants can include aqueous solutions of, by volume, about 10% HF combined with $HNO_3$ in an amount from about 10% to about 30%, for example from about 12% $HNO_3$ to about 30% $HNO_3$, from about 14% $HNO_3$ to about 30% $HNO_3$, from about 16% $HNO_3$ to about 30% $HNO_3$, from about 18% $HNO_3$ to about 30% $HNO_3$, from about 20% $HNO_3$ to about 30% $HNO_3$, from about 22% $HNO_3$ to about 30% $HNO_3$, from about 24% $HNO_3$ to about 30% $HNO_3$, from about 26% $HNO_3$ to about 30% $HNO_3$, from about 28% $HNO_3$ to about 30% $HNO_3$, from about 10% $HNO_3$ to about 28% $HNO_3$, from about 10% $HNO_3$ to about 26% $HNO_3$, from about 10% $HNO_3$ to about 24% $HNO_3$, from about 10% $HNO_3$ to about 22% $HNO_3$, from about 10% $HNO_3$ to about 20% $HNO_3$, from about 10% $HNO_3$ to about 3018 $HNO_3$, from about 10% $HNO_3$ to about 16% $HNO_3$, from about 10% $HNO_3$ to about 14% $HNO_3$, and from about 10% $HNO_3$ to about 12% $HNO_3$, including all ranges and subranges therebetween.

Suitable etchants can include aqueous solutions of, by volume, about 10% HF combined with $H_2SO_4$ in an amount from about 10% to about 30%, for example from about 12% $H_2SO_4$ to about 30% $H_2SO_4$, from about 14% $H_2SO_4$ to about 30% $H_2SO_4$, from about 16% $H_2SO_4$ to about 30% $H_2SO_4$, from about 18% $H_2SO_4$ to about 30% $H_2SO_4$, from about 20% $H_2SO_4$ to about 30% $H_2SO_4$, from about 22% $H_2SO_4$ to about 30% $H_2SO_4$, from about 24% $H_2SO_4$ to about 30% $H_2SO_4$, from about 26% $H_2SO_4$ to about 30% $H_2SO_4$, from about 28% $H_2SO_4$ to about 30% $H_2SO_4$, from about 10% $H_2SO_4$ to about 28% $H_2SO_4$, from about 10% $H_2SO_4$ to about 26% $H_2SO_4$, from about 10% $H_2SO_4$ to about 24% $H_2SO_4$, from about 10% $H_2SO_4$ to about 22% $H_2SO_4$, from about 10% $H_2SO_4$ to about 20% $H_2SO_4$, from about 10% $H_2SO_4$ to about 18% $H_2SO_4$, from about 10% $H_2SO_4$ to about 16% $H_2SO_4$, from about 10% $H_2SO_4$ to about 14% $H_2SO_4$, and from about 10% $H_2SO_4$ to about 12% $H_2SO_4$, including all ranges and subranges therebetween.

Suitable etchants can also include aqueous solutions of, by volume, about 10% HF to about 30% HF, for example from about 12% HF to about 30% HF, from about 14% HF to about 30% HF, from about 16% HF to about 30% HF, from about 18% HF to about 30% HF, from about 20% HF to about 30% HF, from about 22% HF to about 30% HF, from about 24% HF to about 30% HF, from about 26% HF to about 30% HF, from about 28% HF to about 30% HF, from about 10% HF to about 28% HF, from about 10% HF to about 26% HF, from about 10% HF to about 24% HF, from about 10% HF to about 22% HF, from about 10% HF to about 20% HF, from about 10% HF to about 18% HF, from about 10% HF to about 16% HF, from about 10% HF to about 14% HF, and from about 10% HF to about 12% HF, including all ranges and subranges therebetween.

Suitable etchants can further include aqueous solutions of, by volume, about 10% HF combined with HCL in an amount from about 10% to about 30%, for example from about 12% HCL to about 30% HCL, from about 15% HCL to about 30% HCL, from about 18% HCL to about 30% HCL, from about 20% HCL to about 30% HCL, from about 22% HCL to about 30% HCL, from about 24% HCL to about 30% HCL, from about 26% HCL to about 30% HCL, and from about 28% HCL to about 30% HCL, from about 10% HCL to about 28% HCL, from about 10% HCL to about 26% HCL, from about 10% HCL to about 24% HCL, from about 10% HCL to about 22% HCL, from about 10% HCL to about 20% HCL, from about 10% HCL to about 18% HCL, from about 10% HCL to about 16% HCL, from about 10% HCL to about 14% HCL, and from about 10% HCL to about 12% HCL, including all ranges and subranges therebetween.

Figure 10:
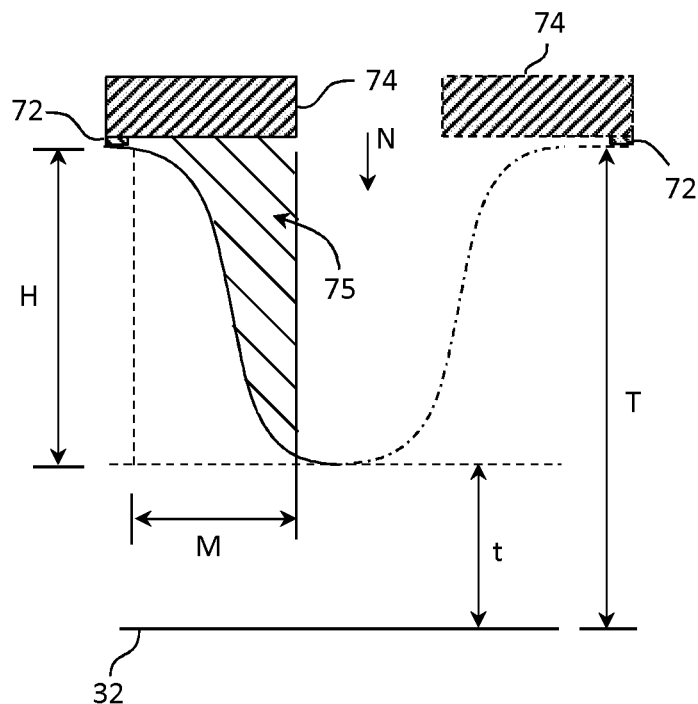
FIG. 10 is a schematic view illustrating undercutting of the etch mask that can occur during etching.

With reference now to FIG. 10, it should be readily apparent that during the etching process, the etchant dissolves the glass substrate along both a direction N in a normal direction orthogonal to the major surfaces of the glass sheet, but also in a direction parallel with one or both of the glass sheet major surfaces a lateral distance M parallel with a plane of the glass sheet, thereby forming an undercut region 75. The distance M extends from an edge of the acid resist material (for example the edge of a strip) to an intersection of the glass major surface and the acid resist material (or adhesion promoter). This lateral undercutting can be detrimental to the performance of an LGP by limiting the resolution of the surface structures (e.g., peaks and channels), that is, by limiting how closely these structures can be positioned (e.g., the narrowness of the structures). Accordingly, it is desirable in some embodiments to minimize the lateral glass dissolution while maximizing dissolution in the normal direction. It was determined through experimentation that a lateral-to-normal distance ratio M/H (where H is the depth of the etched channel) in a range from about 1.2 to about 1.8 was optimal for achieving a width of the peaks of about 50 micrometers, although other ratios, for example in a range from about 1/1 to 30/1, are achievable, such as 3.5/1, 5/1 or 7/1. To arrive at an M/H ratio, multiple 5 cm×5 cm samples of Corning® IRIS™ glass sheets 28 with a 2 millimeter thickness T were prepared using the foregoing procedure with increasingly finer resist material patterns (decreasing line widths), and then etched with a variety of etching solutions. The resist material was applied by screen printing: the screen was first flooded with the resist material to wet the screen, after which printing was commenced. After the resist material pattern was printed onto a major surface of a glass sample, e.g., first and/or second major surface 30, 32 of glass sheet 28, the glass sheet, including the pattern of resist material, was baked at 120° C. for 30 minutes to cure the resist material.

It should also be apparent that specifically shaped structures, i.e., channels and peaks, can be produced by controlling the magnitude of the undercutting. For example, more aggressive undercutting (increased M) can be used to obtain sharper, more defined peaks. Undercutting can be controlled by varying the temperature of the etching solution, the time during which the glass substrate is exposed to the etching solution, and the aggressiveness of the acid solution (e.g., the selection of acids and their concentrations).

It was further found that the magnitude of undercutting can be controlled by varying adhesion of the mask material to the glass surface. That is, varying the adhesion properties of the adhesion promoter, as a separate layer 72 or formulated within the etch mask material, for example an ink jet ink or screen print ink, can result in different characteristics of the structured surface. As described supra, this can be accomplished by the use of different etch mask materials that produce different degrees of adhesion.

Using the etching methods disclosed herein, very small peak and/or channel widths can be obtained. For example, in one experiment, an acid resist material row width (edge-to-edge) of 175 μm was used, wherein the rows of resist material were spaced apart by a gap of 50 μm. The substrate was then exposed to a bath of an acid solution comprising 10% by volume HF and 20% by volume $H_2SO_4$ (with the remainder $H_2O$). The resultant pattern of raised peaks exhibited a width of approximately 125 μm, as measured from one channel floor to the opposite channel floor bounding the peak of the raised portion. If an M/H ratio of about 1.5 is achieved, peak widths equal to or less than about 125 μm are obtainable, for example as small as 50 μm or smaller.

Several methods are available for etching, including bath etching and spray etching. In a bath etching process, the glass sheet with patterned etch mask is positioned in a bath of a selected etchant. The etchant can be circulated, or in other embodiments, the etchant can be agitated, for example by gentle rocking. The etchant is maintained at a suitable temperature during the etching, for example equal to or greater than about 21° C., such as equal to or greater than about 23° C. The glass sheet is exposed to the etchant bath for a period of time sufficient to form the desired structured surface (e.g., peak and channel morphology), for example in a range from about 30 minutes to about 1 hour, then removed and rinsed. Rinsing can be performed by first placing the glass sheet into a bath of deionized (DI) water for about 1 minute, removed and rinsed under hot running water (e.g., tap water) for an additional minute, then dried with $N_2$ gas. The etchant can be replaced on a periodic basis depending, for example, on the number of glass sheets etched. If necessary, remaining etch mask material not removed during the rinsing process can be removed using Parker Transeptic Cleansing Solution, available from Parker Laboratories, diluted to about 4% with DI water, or other suitable cleaning solutions (e.g., Semiclean KG, NaOH).

Alternatively, spray etching may be performed. The etch mask patterned glass sheet is cleaned with DI water, and exposed to an etchant spray, for example for a period of 30 minutes to 40 minutes according to the desired etching (channel) depth, then rinsed with DI water. Remaining etch mask material can be removed, if necessary, with NaOH, and then rinsed with DI water.

Figure 11:
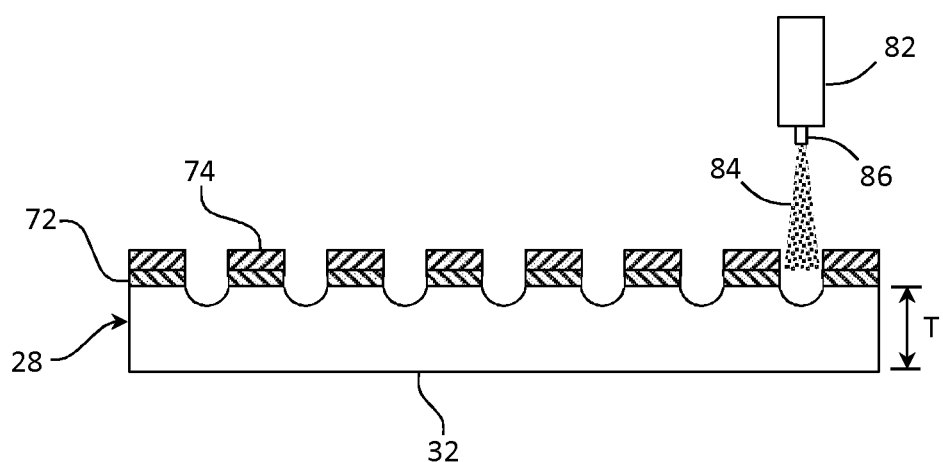
FIG. 11 is a cross sectional view of forming channels in a glass sheet by abrasion.

In other embodiments, for example as illustrated in FIG. 11, channels can be produced in a glass sheet using abrasive blasting (e.g., sandblasting, wet abrasive blasting (e.g., water jet), dry ice blasting, or similar processes), thereby forming channels by abrading a surface of the glass sheet to remove material. Advantageously, abrasive removal of glass can be performed quickly (with a removal rate of approximately 50 μm/second), is scalable, and is automatable. Moreover, steeper channel sidewalls are achievable than can be obtained by wet etching. Post-forming processes to smooth the abraded channels can include flame polishing and abrasive water jet. These and other aspects are described in more detail below.

In accordance with one or more embodiments, an abrasion-resistant material (mask) is applied to at least one major surface of a glass sheet in a predetermined pattern (with or without optional adhesion promoter layer 72, as needed), such as by inkjet or screen printing, according to the manufacturer's recommended practices. A suitable resist material capable of resisting moderate periods of abrasion is Kiwo. Deposition of the mask can be followed by a post-deposition heating (baking) process to remove volatile components and cure the mask material. Post deposition heating can be performed, for example, at a temperature of about 60° C. to about 90° C. for a time from about 60 minutes to about 90 minutes, although faster curing can be performed at a higher temperature, for example 120° C. for about 30 minutes (the curing temperature for Kiwo should not exceed 150° C.). To facilitate optimum defoaming of the etch mask material, the glass sheet should be allowed to rest undisturbed for a time, for example 1 to 2 minutes, at ambient temperature after application of the etch mask material before using any means of forced drying.

Once the etch mask material has been deposited and baked, an abrasive applicator (82) (sandblaster) can be used to abrade material from the unmasked (unprotected) areas of the glass sheet using an abrasive material, for example alumina particles, entrained in a fluid (e.g., air or water) stream 84 to form channels 60. Smaller grit sizes will produce smoother surface finishes and reduce the amount of post abrasion smoothing that may be required to achieve a desired surface roughness, however at the cost of longer process times. Grit sizes in a range from about 10 μm to about 20 μm have been shown to produce acceptable results, although other grit sizes may be used. The abrasive applicator may include a nozzle 86 for directing the entrained abrasive. For example, in embodiments, nozzle 86 can be a slot nozzle, which during experimentation provided a relatively broad, uniform spread of abrasive particles along a travel path of the nozzle relative to a major surface of the glass sheet, and produced a uniform abrasion of the glass sheet surface over regions of the glass sheet surface not protected by etch mask 74.

In embodiments, nozzle 86 can be traversed multiple times over the same path before moving to a next path. For example, during experimental trials, an abrasive delivery device (a Comco Accuflow Microblaster) was traversed at a speed of about 20 mm/second over a glass sheet along a first path a total of six times with the nozzle of the device positioned approximately 0.85 cm from the surface of the glass sheet. The nozzle, with a diameter of about 0.5 mm, was then advanced in a direction orthogonal to the first path about 1 mm and traversed another six times along a second path parallel with the first path (but offset by the 1 mm step). The back pressure of the abrasive delivery device (e.g., pressure of the delivery gas) was about 0.55 megaPascal (MPa). The preceding process was continued in 1 mm steps until the desired abrasion was completed.

Using the abrasion process above, it was found that linear channels between the etch mask strips could be quickly produced in the glass sheet, these channels positioned between and defining peaks beneath the mask. These channels extended in linear rows. A depth H of these channels (i.e., in a direction normal to a plane of the glass sheet) was about 37 μm, and were produced with a period P of about 385 μm.

It should be noted that although the etch mask material, such as the aforementioned Kiwo, may be resistant to abrasion, it will nevertheless abrade when exposed to a stream of abrasive particles for a sufficient period of time. Thus, care should be taken to use the minimum residence time at which the abrasive particles are directed at any one location on the glass sheet. This will depend on the size and nature (e.g., hardness and "sharpness") of the abrasive particles, the gas pressure used to propel the particles, the size of the impingement area of the particles, the traverse speed of the impingement area and the distance between the nozzle and the work piece (e.g., glass sheet).

Once abrasion of the glass sheet has been completed and channels of the desired depth have been produced, the abraded channels may be smoothed to reduce the surface roughness of the abraded portions. A buffered HF—(NH$_4$)HF$_2$ solution, blended with HCl, was tried, but was found to be overly aggressive and produced unacceptable undercutting of the masked areas if applied with the mask in place, and with the mask removed, material was removed from the entire surface of the glass sheet, including the peaks just formed in the glass sheet surface.

An alternative approach to wet chemical smoothing is an abrasive liquid jetting process, wherein an abrasive of sufficiently small grit size is entrained in a liquid (e.g., water), and directed at the previously abraded surfaces of the glass sheet at high pressure.

Another alternative method of smoothing the abraded surfaces of the glass sheet comprises flame or plasma polishing by heating the abraded surface sufficiently to cause glass flow, although care should be taken to not overheat and cause distortion of the glass surface.

The glass sheet, and more particularly, surface of the channels, and more particularly still, sidewalls of the channels, should be smoothed such that an RMS roughness of the sidewalls is equal to or less than about 5 μm when measured by white light interferometry, for example equal to or less than about 1 μm. Once the abrading step, and optionally the smoothing step are completed, the glass sheet can be washed, for example with NaOH, to remove all mask material and abrasion residue. Further washing and drying can be performed as needed, for example with water and dry nitrogen (N$_2$), respectively.

Figure 12:
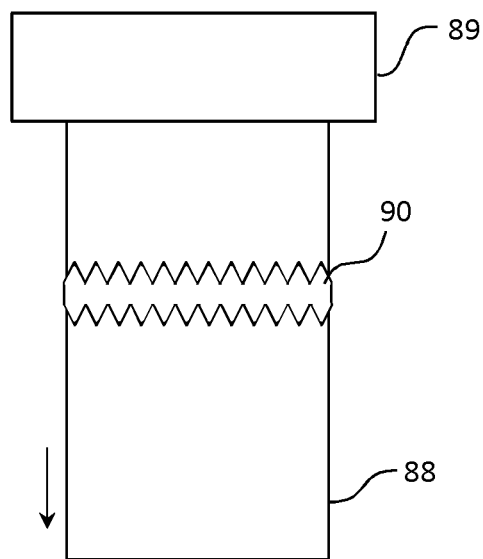
FIG. 12 is a front view of a glass ribbon being drawn from a forming apparatus, wherein a structured surface comprising channels is formed by embossing rolls.

In still other embodiments, channels 60 (or peaks 62) may be formed during a glass forming process, e.g., after drawing a glass ribbon 88 from a forming body 89 but before cooling the ribbon to form a glass sheet. The glass ribbon may be formed by a float process, a down draw process (e.g., a fusion down draw process, a slot draw process, or any other process capable of forming a glass ribbon. The glass ribbon prior to cooling may be viscous enough to be manipulated to create desired features. For instance, channels 60 (or peaks) can be formed via manipulation of direct contact forces, e.g., using an embossing rolls 90, for example opposing, counter-rotating embossing rolls, as shown in FIG. 12. Embossing rolls 90 can be machined to create the desired structure when impressed on glass ribbon 88. In a viscous region of the glass forming process, the glass ribbon may be drawn between the rolls to create the desired channels or peaks. A transfer function may be used to describe the ratio between the machined structures and the resulting glass pattern that accounts for contact forces, pulling forces, and viscous stretching or thermal expansion. The contact method may, in various embodiments, be applicable to glass compositions having a viscosity η and Young's modulus of elasticity E, wherein 0.0005 seconds <η/E<0.2 seconds. The contact method can be used, for instance, to create any of the channel or peaks shapes illustrated in FIGS. 3A through 7B.

Figure 13:
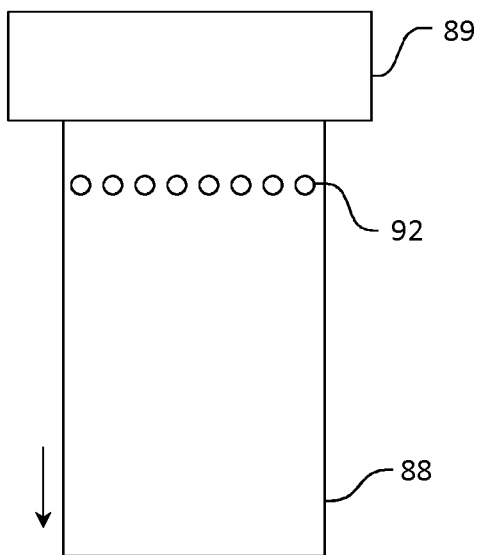
FIG. 13 is a front view of a glass ribbon being drawn from a forming apparatus, wherein a structured surface comprising channels is formed by local heating and/or cooling elements arranged across a width of the ribbon.

Channels 60 and peaks 62 may additionally be formed on a surface of the glass ribbon by providing regions of local heating and/or cooling relative to the rest of the ribbon as depicted in FIG. 13. Such regions may be produced by local heating/an/or cooling elements 92, for example by impinging the glass ribbon with hot and/or cold gas, e.g., air from a series of tubes arranged across a width of the glass ribbon 88. The aspect ratio (H/W) of the peaks or the aspect ratio (H/S) of the channels can be controlled by methods of heating and/or cooling, e.g., direct or indirect, by varying an orifice size through which gas flows, and/or by varying the gas flow rate. Exemplary methods for locally heating and/or cooling the glass ribbon may employ, for instance, a tool that operates conductively as a heat sink, one or more tubes arranged to blow a heating and/or cooling fluid (e.g., air) directly on the glass ribbon, a system comprising a plurality of tubes arranged to blow a heating and/or cooling fluid on a surface of a plate or other structure positioned between the tubes and the glass ribbon, or other similar equipment. The local heating and/or cooling method may, in certain embodiments, be applicable to glass compositions having a viscosity η and Young's modulus of elasticity E, wherein $3.3 \times 10^{-7}$ seconds <η/E<$1.6 \times 10^{-5}$ seconds.

Figure 14:
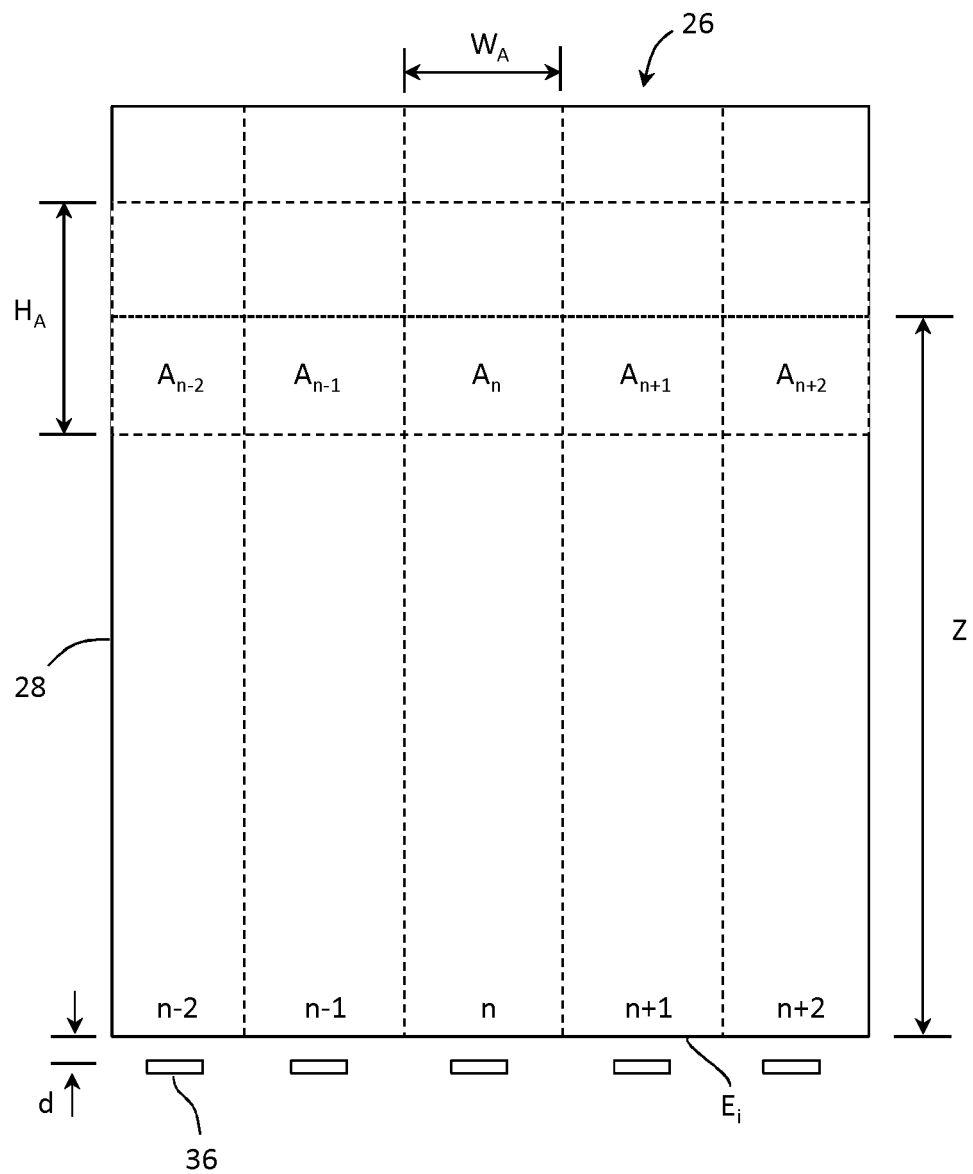
FIG. 14 is a schematic view of a LGP illustrating parameters for calculating a local dimming index LDI and a straightness index SI.

The performance of local dimming optics for 1D light confinement can be evaluated by several parameters, for example LDI and a straightness index (SI), both expressed as a percent. As shown in FIG. 14, LDI and SI at a distance Z from a LED input edge $E_i$ can respectively be defined as:

$$LDI = \left[1 - \frac{(L_{n+1} + L_{n-1}/2)}{L_n}\right] \times 100 \qquad (1)$$

$$\text{Straightness} = \frac{(L_{n-2} + L_{n+2})/2}{L_n} \times 100 \qquad (2)$$

where $L_m$ is the luminance of the area $A_m$ of zone m (m=n−2, n−1, n, n+1, n+2) at the distance Z from LED input edge. Each area $A_m$ can be defined by a width $W_A$ and a height $H_A$. LDI and SI are functions of the luminance of zones of an LGP, and serve as convenient performance measures. As a practical matter, LDI is a measure of the degree of confinement of light injected into a given zone of the LGP, i.e., how much light is retained within that zone. The larger the magnitude of LDI, the better the light confinement performance of the LGP (more light confined within the light-injected zone). Conversely, the straightness index SI is a measure of the amount of light leaking from the light-injected zone into other zones Accordingly, the lower the magnitude of the straightness index SI, the better the performance of the LGP.

Tables 2A-5B show calculated LDI values for modeled channels of various configurations for two glass sheets of 1.1 mm and 2.1 mm thickness and a variety of different geometries. All H, W and S values are given in micrometers (μm). Glass sheets with an LDI greater than 0.70 are considered to be passing (acceptable), wherein glass sheets with an LDI equal to or less than 0.70 are considered to be failing. It should be noted, however, that 0.70 as a cut off between pass and fail is subjective, and the pass/fail criterion may vary depending on specific application and need. For example, in some applications, an acceptable LDI can be less than 0.70.

Data for a stepped cross sectional shape (e.g., FIG. 3A) is provided in Table 2A, while data for an arcuate cross sectional shape (e.g., FIG. 3B) is provided in Table 2B. The data show that, as the depth of the channels (H) increases, LDI also increases. The data show that, as glass sheet thickness decreases, channels with a smaller H/S ratio become sufficiently effective for 1D local dimming (LDI ≥0.7), while channels with the same H/S ratios formed on thicker glass may not be sufficiently effective for 1D local dimming. This advantage is not readily available for PMMA or other plastic-based light guides, as thin PMMA suffers from low mechanical strength and high thermal expansion for large sized TV application. All individual H, S and W values in Tables 2A-5B are given in micrometers.

TABLE 2A

| H | S | W | H/S | S/H | W/S | T = 1.1 mm Step LDI | | T = 2.1 mm Step LDI | |
|---|---|---|---|---|---|---|---|---|---|
| 45 | 150 | 150 | 0.3 | 3.33 | 1 | 0.83 | Pass | 0.78 | Pass |
| 40 | 150 | 150 | 0.27 | 3.70 | 1 | 0.82 | Pass | 0.77 | Pass |
| 35 | 150 | 150 | 0.23 | 4.35 | 1 | 0.82 | Pass | 0.77 | Pass |
| 30 | 150 | 150 | 0.20 | 5.00 | 1 | 0.82 | Pass | 0.76 | Pass |
| 25 | 150 | 150 | 0.17 | 5.88 | 1 | 0.78 | Pass | 0.74 | Pass |
| 20 | 150 | 150 | 0.13 | 7.69 | 1 | 0.79 | Pass | 0.70 | Pass |
| 15 | 150 | 150 | 0.10 | 10.00 | 1 | 0.76 | Pass | 0.71 | Pass |
| 10 | 150 | 150 | 0.07 | 14.29 | 1 | 0.72 | Pass | 0.65 | Fail |
| 5 | 150 | 150 | 0.03 | 33.33 | 1 | 0.65 | Fail | 0.58 | Fail |
| 0 | 150 | 150 | 0 | 0 | 1 | 0.36 | Fail | 0.28 | Fail |

TABLE 2B

| H | S | W | H/S | S/H | W/S | T = 1.1 mm Arcuate LDI | | T = 2.1 mm Arcuate LDI | |
|---|---|---|---|---|---|---|---|---|---|
| 45 | 115.2 | 184.8 | 0.39 | 2.56 | 1.60 | 0.85 | Pass | 0.76 | Pass |
| 40 | 113.4 | 186.6 | 0.35 | 2.86 | 1.65 | 0.84 | Pass | 0.74 | Pass |
| 35 | 111.7 | 188.3 | 0.31 | 3.23 | 1.69 | 0.81 | Pass | 0.71 | Pass |
| 30 | 110.2 | 189.8 | 0.27 | 3.70 | 1.72 | 0.77 | Pass | 0.66 | Fail |
| 25 | 109.0 | 191.0 | 0.23 | 4.35 | 1.75 | 0.72 | Pass | 0.59 | Fail |
| 20 | 107.9 | 192.1 | 0.19 | 5.26 | 1.78 | 0.64 | Fail | 0.50 | Fail |
| 15 | 107.1 | 192.9 | 0.14 | 7.14 | 1.80 | 0.53 | Fail | 0.40 | Fail |
| 10 | 106.5 | 193.5 | 0.09 | 11.11 | 1.82 | 0.36 | Fail | 0.32 | Fail |
| 5 | 106.2 | 193.8 | 0.05 | 20 | 1.83 | 0.34 | Fail | 0.23 | Fail |
| 0 | 106.1 | 193.9 | 0 | 0 | 1.83 | 0.36 | Fail | 0.28 | Fail |

Tables 3A (step) and 3B (arcuate) below show the calculated LDI of glass sheets comprising channels with different W/S ratios but the same H/S ratios for 1.1 mm and 2.1 mm thick glass sheets resulting from varying the peak width W between channels. The channels themselves remained consistent. For channels with the same depth to width ratio H/S but varying the peak width W and therefore varying the W/S ratio, the 1.1 mm thick glass sheet shows better LDI than the 2.1 mm thick glass sheet. The data further show that as the glass sheet thickness becomes smaller, channels with a larger W/S ratio become effective for 1D local dimming (LDI ≥0.7).

TABLE 3A

| H | S | W | H/S | S/H | W/S | T = 1.1 mm Step LDI | | T = 2.1 mm Step LDI | |
|---|---|---|---|---|---|---|---|---|---|
| 45 | 150 | 150 | 0.3 | 3.33 | 1 | 0.83 | Pass | 0.78 | Pass |
| 45 | 150 | 300 | 0.3 | 3.33 | 2 | 0.83 | Pass | 0.78 | Pass |
| 45 | 150 | 450 | 0.3 | 3.33 | 3 | 0.81 | Pass | 0.75 | Pass |
| 45 | 150 | 600 | 0.3 | 3.33 | 4 | 0.78 | Pass | 0.70 | Fail |
| 45 | 150 | 750 | 0.3 | 3.33 | 5 | 0.78 | Pass | 0.72 | Pass |
| 45 | 150 | 900 | 0.3 | 3.33 | 6 | 0.75 | Pass | 0.71 | Pass |
| 45 | 150 | 1050 | 0.3 | 3.33 | 7 | 0.76 | Pass | 0.67 | Fail |
| 45 | 150 | 1200 | 0.3 | 3.33 | 8 | 0.71 | Pass | 0.63 | Fail |
| 45 | 150 | 1350 | 0.3 | 3.33 | 9 | 0.73 | Pass | 0.65 | Fail |
| 45 | 150 | 1500 | 0.3 | 3.33 | 10 | 0.73 | Pass | 0.62 | Fail |
| 45 | 150 | 1650 | 0.3 | 3.33 | 11 | 0.71 | Pass | 0.63 | Fail |
| 45 | 150 | 1800 | 0.3 | 3.33 | 12 | 0.71 | Pass | 0.63 | Fail |
| 45 | 150 | 1950 | 0.3 | 3.33 | 13 | 0.70 | Fail | 0.58 | Fail |

TABLE 3B

| H | S | W | H/S | S/H | W/S | T = 1.1 mm Arcuate LDI | | T = 2.1 mm Arcuate LDI | |
|---|---|---|---|---|---|---|---|---|---|
| 45 | 115.2 | 184.8 | 0.39 | 2.56 | 1.60 | 0.85 | Pass | 0.76 | Pass |
| 45 | 115.2 | 334.8 | 0.39 | 2.56 | 2.91 | 0.83 | Pass | 0.72 | Pass |
| 45 | 115.2 | 484.8 | 0.39 | 2.56 | 4.21 | 0.78 | Pass | 0.69 | Fail |
| 45 | 115.2 | 634.8 | 0.39 | 2.56 | 5.51 | 0.75 | Pass | 0.62 | Fail |
| 45 | 115.2 | 784.8 | 0.39 | 2.56 | 6.81 | 0.73 | Pass | 0.61 | Fail |
| 45 | 115.2 | 934.8 | 0.39 | 2.56 | 8.11 | 0.70 | Fail | 0.60 | Fail |
| 45 | 115.2 | 1084.8 | 0.39 | 2.56 | 9.42 | 0.70 | Fail | 0.57 | Fail |
| 45 | 115.2 | 1234.8 | 0.39 | 2.56 | 10.72 | 0.68 | Fail | 0.55 | Fail |
| 45 | 115.2 | 1384.8 | 0.39 | 2.56 | 12.02 | 0.65 | Fail | 0.53 | Fail |
| 45 | 115.2 | 1534.8 | 0.39 | 2.56 | 13.32 | 0.66 | Fail | 0.52 | Fail |
| 45 | 115.2 | 1684.8 | 0.39 | 2.56 | 14.62 | 0.64 | Fail | 0.44 | Fail |
| 45 | 115.2 | 1834.8 | 0.39 | 2.56 | 15.92 | 0.63 | Fail | 0.48 | Fail |
| 45 | 115.2 | 1984.8 | 0.39 | 2.56 | 17.23 | 0.59 | Fail | 0.45 | Fail |

Table 4A (step) and Table 4B (arcuate), and Table 5A (step) and Table 5B (arcuate) below show calculated LDI for glass sheets comprising channels for a 0.6 mm thick glass sheet as a result of varying channel depth. For channels with the same W/S ratio but with a varying H/S ratio as a result of varying channel depth H, the 0.6 mm thick glass sheet shows better LDI than either one of the 1.1 mm or 2.1 mm thick glass sheets presented in Tables 2A, 2B and 3A, 3B for the same values of H, S and W.

Tables 5A and 5B present modeled data for the same glass sheet as Tables 4A, 4B, but assume a peak width W and channel width S that are one half the peak width W and channel width S assumed in Tables 4A and 4B. Comparing Tables 4A, 4B with Table 5A, 5B, a decreased period P exhibits similar behavior. All H, S and W values are given in micrometers.

TABLE 4A

| H | S | W | H/S | S/H | W/S | T = 0.6 mm Step LDI | |
|---|---|---|---|---|---|---|---|
| 45 | 150 | 150 | 0.3 | 3.33 | 1 | 0.89 | Pass |
| 40 | 150 | 150 | 0.27 | 3.70 | 1 | 0.88 | Pass |
| 35 | 150 | 150 | 0.23 | 4.35 | 1 | 0.88 | Pass |
| 30 | 150 | 150 | 0.2 | 5.00 | 1 | 0.87 | Pass |
| 25 | 150 | 150 | 0.17 | 5.88 | 1 | 0.86 | Pass |

TABLE 4A-continued

| H | S | W | H/S | S/H | W/S | T = 0.6 mm Step LDI | |
|---|---|---|---|---|---|---|---|
| 20 | 150 | 150 | 0.13 | 7.69 | 1 | 0.83 | Pass |
| 15 | 150 | 150 | 0.1 | 10.00 | 1 | 0.83 | Pass |
| 10 | 150 | 150 | 0.07 | 14.29 | 1 | 0.79 | Pass |
| 5 | 150 | 150 | 0.03 | 33.33 | 1 | 0.70 | Fail |
| 0 | 150 | 150 | 0 | — | 1 | 0.36 | Fail |

TABLE 4B

| H | S | W | H/S | S/H | W/S | T = 0.6 mm Arcuate LDI | |
|---|---|---|---|---|---|---|---|
| 45 | 115.2 | 184.8 | 0.39 | 2.56 | 1.60 | 0.85 | Pass |
| 40 | 113.4 | 186.6 | 0.35 | 2.86 | 1.65 | 0.84 | Pass |
| 35 | 111.7 | 188.3 | 0.31 | 3.23 | 1.69 | 0.81 | Pass |
| 30 | 110.2 | 189.8 | 0.27 | 3.70 | 1.72 | 0.77 | Pass |
| 25 | 109.0 | 191.0 | 0.23 | 4.35 | 1.75 | 0.72 | Pass |
| 20 | 107.9 | 192.1 | 0.19 | 5.26 | 1.78 | 0.64 | Fail |
| 15 | 107.1 | 192.9 | 0.14 | 7.14 | 1.80 | 0.53 | Fail |
| 10 | 106.5 | 193.5 | 0.09 | 11.11 | 1.82 | 0.36 | Fail |
| 5 | 106.2 | 193.8 | 0.05 | 20 | 1.83 | 0.34 | Fail |
| 0 | 106.1 | 193.9 | 0.00 | — | 1.83 | 0.36 | Fail |

TABLE 5A

| H | S | W | H/S | S/H | W/S | T = 0.6 mm Step LDI | |
|---|---|---|---|---|---|---|---|
| 45 | 75 | 75 | 0.6 | 1.67 | 1 | 0.92 | Pass |
| 40 | 75 | 75 | 0.53 | 1.89 | 1 | 0.91 | Pass |
| 35 | 75 | 75 | 0.47 | 2.13 | 1 | 0.91 | Pass |
| 30 | 75 | 75 | 0.4 | 2.5 | 1 | 0.89 | Pass |
| 25 | 75 | 75 | 0.3 | 3.33 | 1 | 0.89 | Pass |
| 20 | 75 | 75 | 0.27 | 3.70 | 1 | 0.89 | Pass |
| 15 | 75 | 75 | 0.2 | 5 | 1 | 0.86 | Pass |
| 10 | 75 | 75 | 0.13 | 7.69 | 1 | 0.84 | Pass |
| 5 | 75 | 75 | 0.067 | 14.93 | 1 | 0.80 | Pass |
| 0 | 75 | 75 | 0 | — | 1 | 0.36 | Fail |

TABLE 5B

| H | S | W | H/S | S/H | W/S | T = 0.6 mm Arcuate LDI | |
|---|---|---|---|---|---|---|---|
| 45 | 69.6 | 80.4 | 0.65 | 1.54 | 1.16 | 0.92 | Pass |
| 40 | 66.4 | 83.6 | 0.60 | 1.67 | 1.26 | 0.92 | Pass |
| 35 | 63.5 | 86.5 | 0.55 | 1.82 | 1.36 | 0.92 | Pass |
| 30 | 60.9 | 89.1 | 0.49 | 2.04 | 1.46 | 0.91 | Pass |
| 25 | 58.6 | 91.4 | 0.43 | 2.33 | 1.56 | 0.89 | Pass |
| 20 | 56.7 | 93.3 | 0.35 | 2.86 | 1.65 | 0.89 | Pass |
| 15 | 55.1 | 94.9 | 0.27 | 3.70 | 1.72 | 0.85 | Pass |
| 10 | 54.0 | 96.0 | 0.19 | 5.26 | 1.78 | 0.75 | Pass |
| 5 | 53.3 | 96.7 | 0.09 | 11.11 | 1.82 | 0.47 | Fail |
| 0 | 53.0 | 97.0 | 0.00 | — | 1.83 | 0.36 | Fail |

Figure 15:
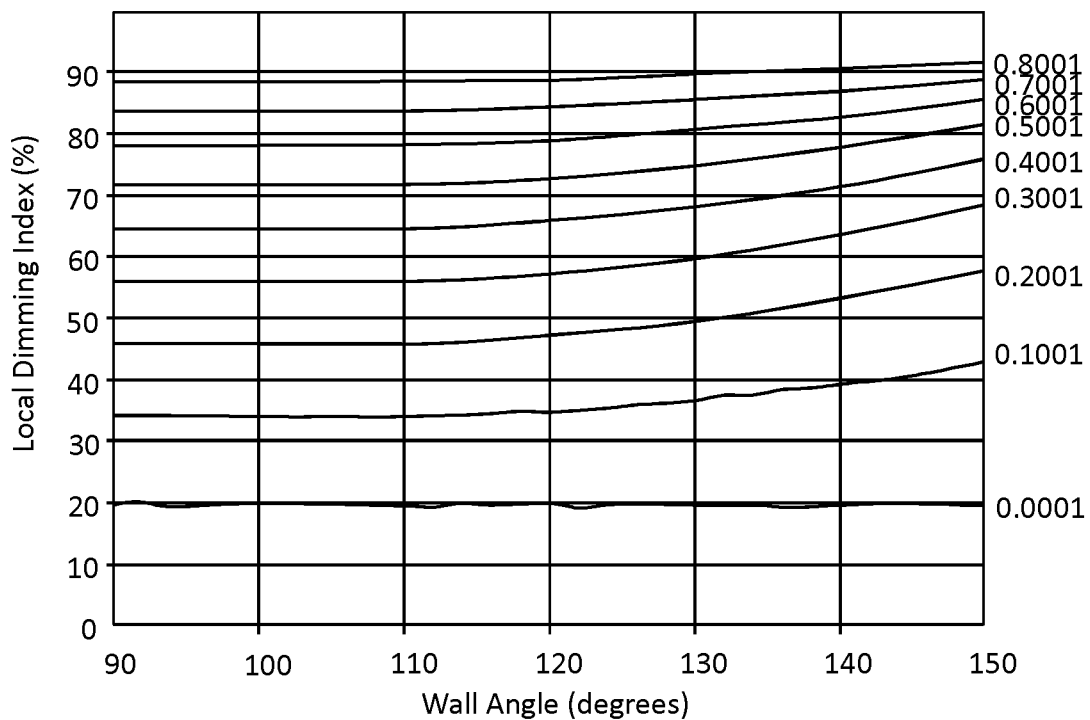
FIG. 15 is a depicting LDI as a function of wall angle, such as for trapezoidal channels.

FIG. 15 plots LDI at a 300 mm distance from the light input edge as a function of channel wall angle Θ (see FIG. 7A) for different channel depths for a trapezoidal channel shape, from top to bottom: 0.8001 mm, 0.7001 mm, 0.6001 mm, 0.5001 mm, 0.4001 mm, 0.3001 mm, 0.2001 mm, 0.1001 mm, 0.0001 mm). As illustrated by the plot, LDI increases as the channel depth increases. LDI also increases as the wall angle Θ increases. The impact of the wall angle Θ becomes stronger with increasing channel depth. For the above parameters, an LDI of 75% or greater can be achieved using a channel depth of at least about 0.4 mm and a wall angle of at least about 150°. Similar LDI values can be achieved with smaller wall angles using greater channel depths.

Table 6 below shows LGP, LED, and structured surface parameters for a backlight unit comprising a glass sheet with a structured major surface as illustrated in FIG. 4A.

TABLE 6

| LGP thickness T (mm) | 1.1 |
|---|---|
| LGP width (mm) | 500 |
| LGP length (mm) | 750 |
| LGP refractive index | 1.50 |
| Peak width W (mm) | 0.866 |
| Peak height H (mm) | 0.15 |
| Local dimming zone width (mm) | 150 |
| LEDs in a single local dimming zone | 10 |
| LED-LGP gap (mm) | 0.01 |
| LED width | 1.0 |
| LED length | 4.5 |

Figure 16A:
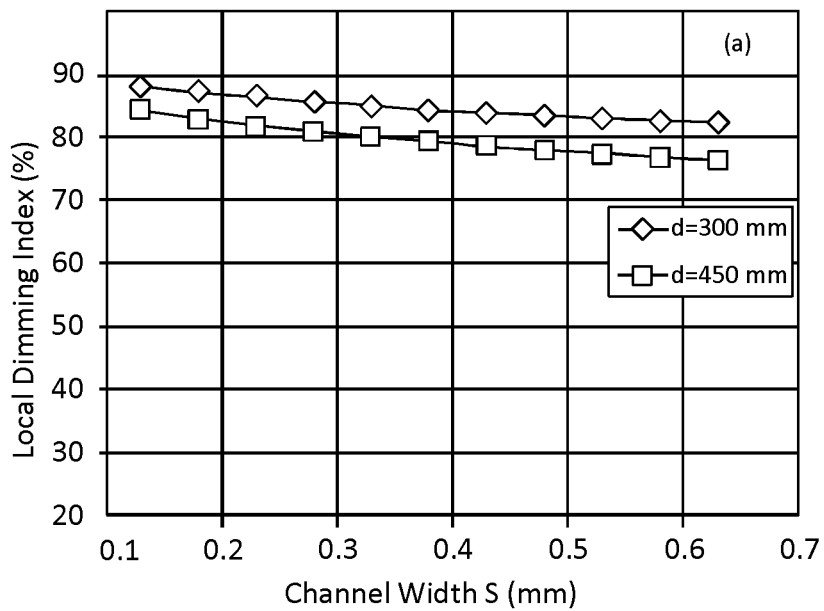
FIG. 16A is a plot depicting LDI as a function of channel width S at two different distances from the light input edge of an LGP with a single structured surface.
Figure 16B:
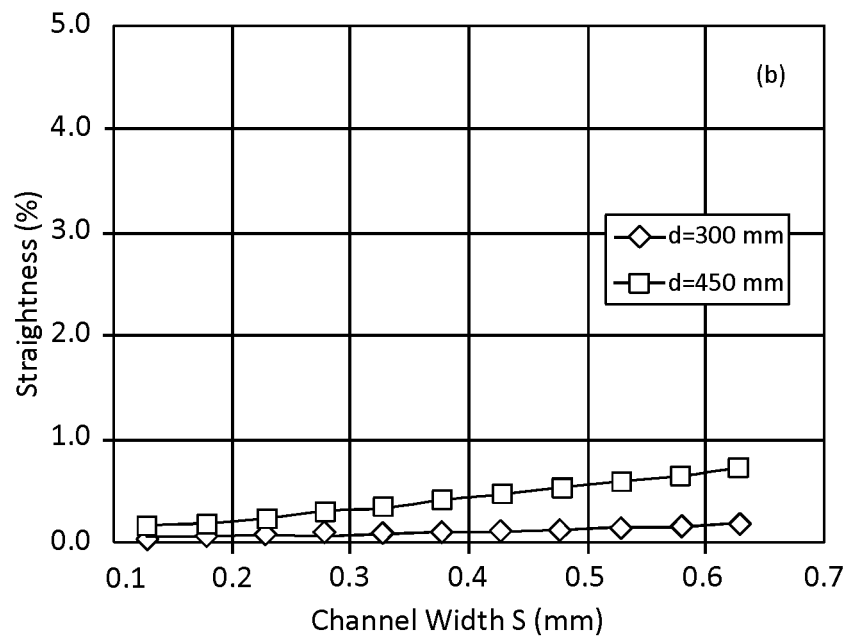
FIG. 16B is a plot depicting straightness index SI as a function of channel width S at two different distances from the light input edge of an LGP with a single structured surface.

FIGS. 16A-16B depict modeled LDI and SI, respectively, for 300 and 450 mm distances d from the light input edge as a function of the channel width S for an LGP as described in Table 6. As shown in FIG. 16A, LDI decreases as channel width S increases. Conversely, as shown in FIG. 16B, SI increases as the channel width S increases. For the above parameters, good local dimming performance, as indicated by LDI greater than 80% and straightness less than 0.2%, can be achieved at a 450 mm distance from the input edge when a 0.2 mm gap width U, or less, is used between adjacent peaks.

Figure 17A:
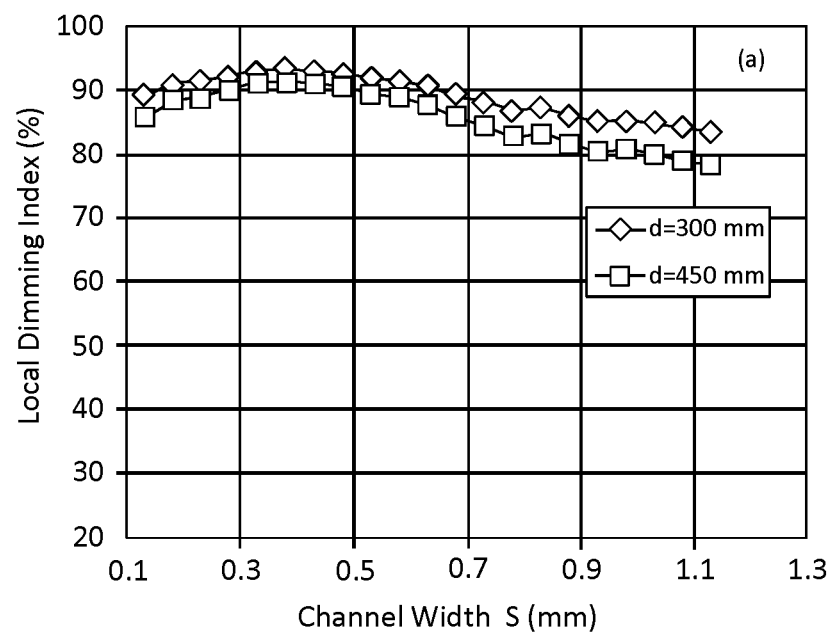
FIG. 17A is a plot depicting LDI as a function of channel width S at two different distance from the light input edge of an LGP with two opposing structured surfaces.
Figure 17B:
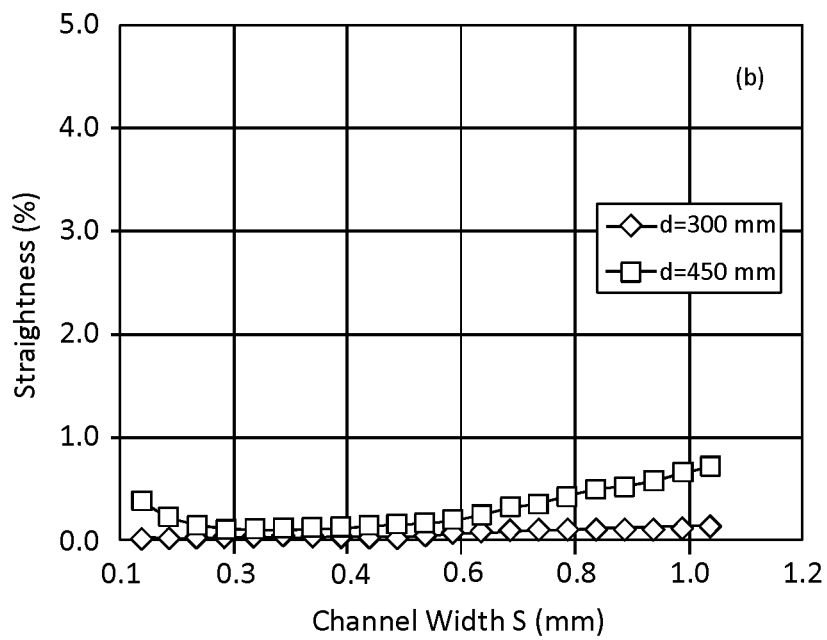
FIG. 17B is a plot depicting SI as a function of channel width S at two different distances from the light input edge of an LGP with two opposing structured surfaces.

FIGS. 17A-17B depict modeled LDI and SI, respectively, for the same backlight unit as described in respect of Table 6, but with a second structured surface opposing the first structured surface and identical to the first structured surface (e.g., FIG. 5A). LDI and SI were again calculated for 300 and 450 mm distances from the LED input edge as a function of channel width S between adjacent channels. LDI and SI are both improved for a glass sheet with two opposing structured surfaces as compared to a glass sheet with only a single structured major surface (see FIGS. 16A-16B). At a 450 mm distance from the light input edge and a gap U of 0.22 mm, LDI is as high as 91% and SI as low as 0.1%, indicating excellent local dimming performance. In addition, as compared to glass sheets with only a single structured major surface, LDI greater than 80% can be achieved within a much wider gap width U range (from about 0 to about 0.9 mm) for glass sheets comprising two opposing structured major surfaces, providing greater manufacturing leeway.

Figure 18:
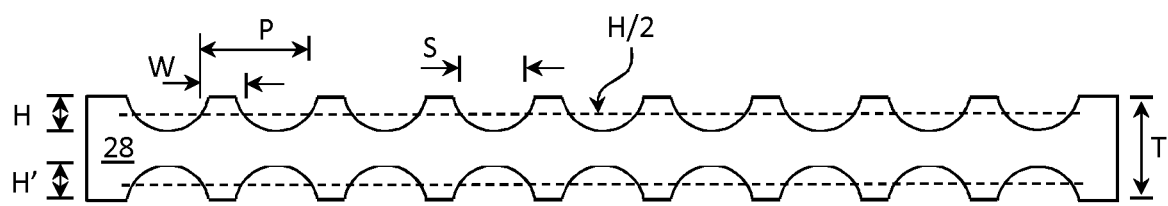
FIG. 18 is a cross sectional view of another embodiment of a glass sheet comprising two opposing structured surfaces with alternating rows of channels and peaks.

Table 7 below shows LGP, LED, and structured surface parameters for another backlight unit comprising a glass sheet with a structured major surface as illustrated in FIG. 18.

TABLE 7

| LGP thickness T (mm) | 1.1 |
|---|---|
| LGP width (mm) | 500 |
| LGP length (mm) | 750 |
| LGP refractive index | 1.50 |
| Channel width S (μm) | 112.5 |
| Channel depth H (μm) | 50 |
| Local dimming zone width (mm) | 150 |
| LEDs in a single local dimming zone | 10 |
| LED-LGP gap (mm) | 0.01 |
| LED width | 1.0 |
| LED length | 4.5 |

Figure 19A:
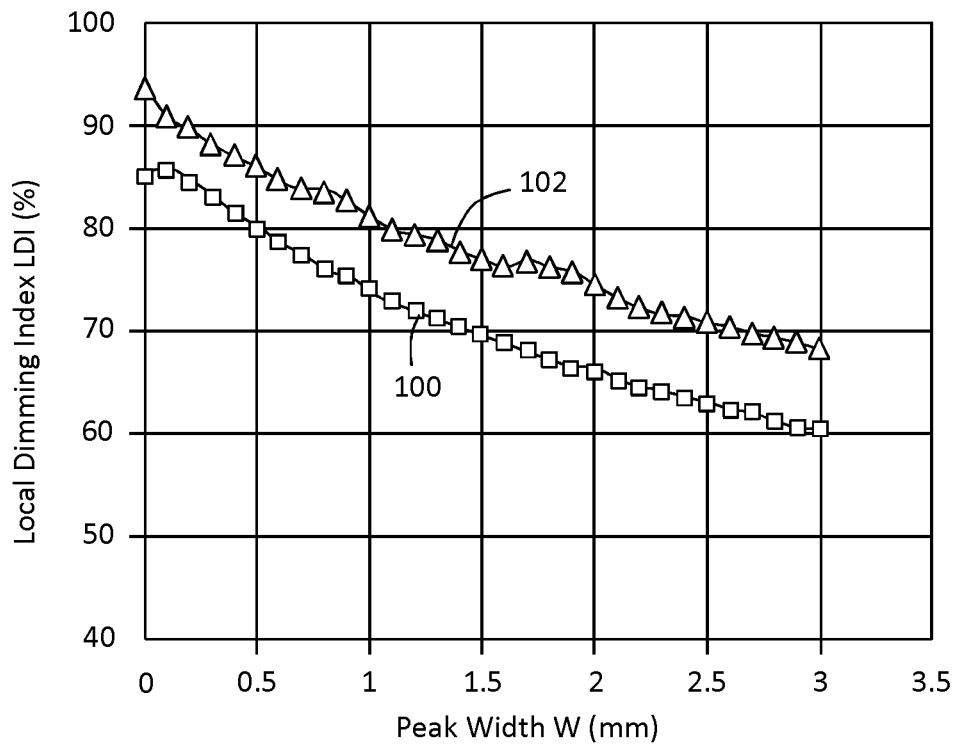
FIG. 19A a plot depicting LDI as a function of peak width W for an LGP with a single structured surface and an LGP with two opposing structured surfaces at a distance 450 mm from an input edge of the LGP.

FIG. 19A is a plot of modeled LDI calculated at a distance 450 mm from the light input edge of a glass LGP with a single structured surface as depicted in FIG. 3B (curve 100), and for two opposing structured surfaces (curve 102) (see FIG. 14), as a function of peak width W. Channel width S was 112.5 µm and channel depth H was 50 µm. The data show that for both single and double structured surfaces, as peak width W increases, LDI decreases, with LDI for two opposing structured surfaces somewhat better than for a single structured surface. However, the data further show that the better LDI performance for an LGP comprising a glass sheet with two opposing structured surfaces can tolerate an almost 2× change in peak width for the same LDI value. This increases the manufacturability of the LGP by easing the tolerances necessary for the LGP manufacture.

Figure 19B:
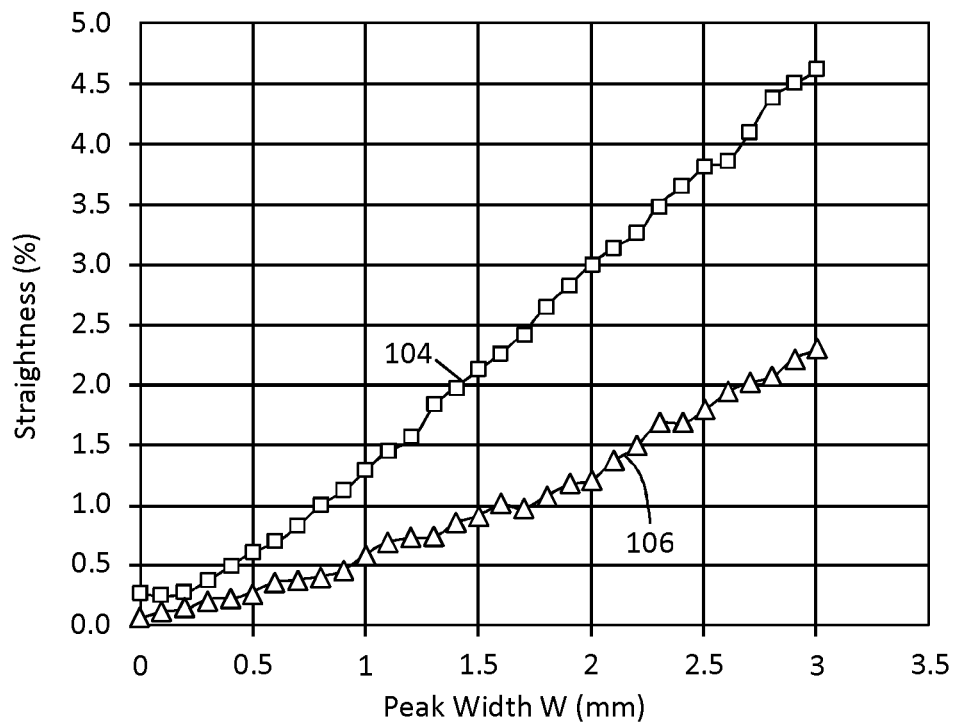
FIG. 19B a plot depicting SI as a function of peak width W for an LGP with a single structured surface and an LGP with two opposing structured surfaces at a distance 450 mm from an input edge of the LGP.

FIG. 19B is a plot of modeled SI as a function of channel width for the same LGP as FIG. 19A, again for both single (FIG. 3B) and double (FIG. 18) structured surfaces, (curves 104, 106, respectively). The data show that as peak width W increases, SI also increases. That is, as peak width increases, more light is leaking from the light-injected zone into neighboring zones. The data reveal that for a given peak width, considerably more light is leaking from the light-injected zone for a single structured surface than for the double structured surfaces.

Together, FIGS. 19A and 19B show that an LDI greater than 80% and a straightness index less than about 1%, for example equal to or less than about 0.68% can be achieved with a channel width less than about 1.1 mm, indicating that excellent light confinement (or local dimming) performance can be achieved with a wide range of peak widths. Thus, an LGP incorporating a glass sheet with two opposing structured major surfaces can provide a wider operating window for LGP fabrication, which benefits both the selection of the fabrication process and process cost.

Figure 20A:
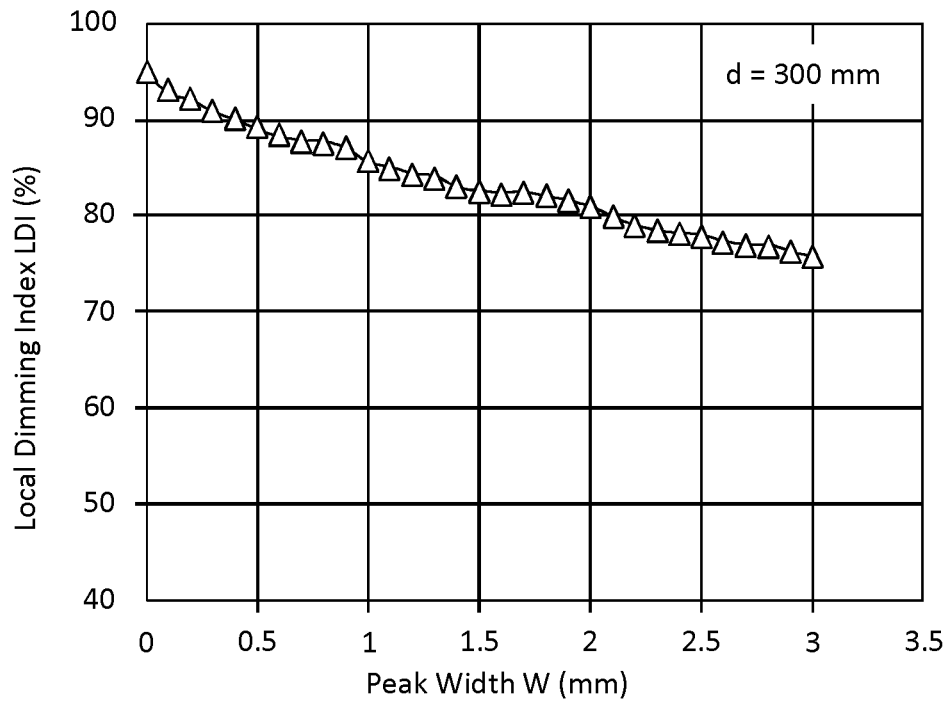
FIG. 20A a plot depicting LDI as a function of peak width W for an LGP with a single structured surface and an LGP with two opposing structured surfaces at a distance 300 mm from an input edge of the LGP.
Figure 20B:
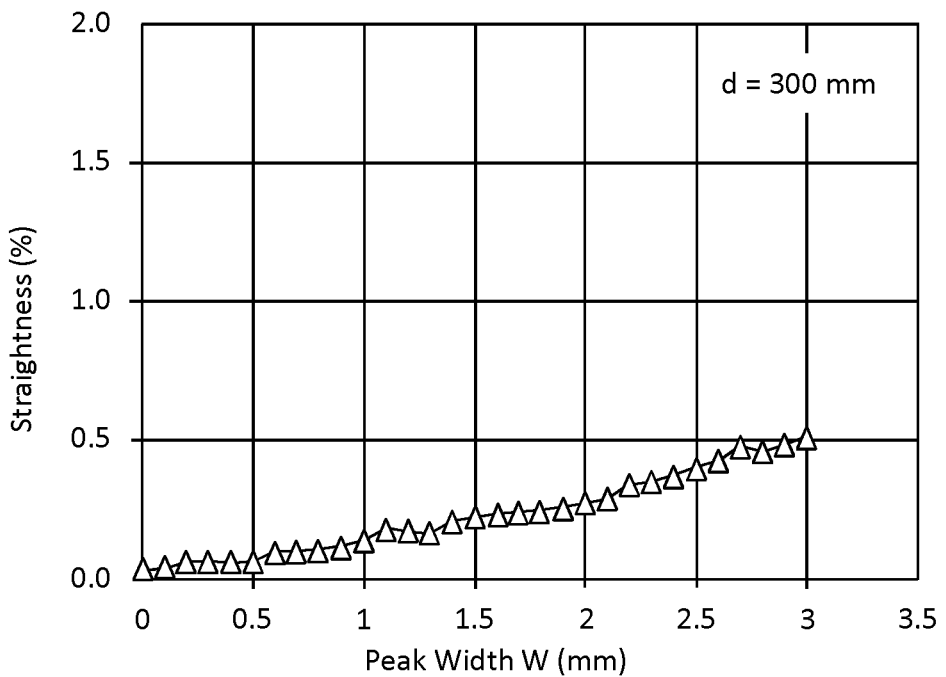
FIG. 20B a plot depicting SI as a function of peak width W for an LGP with a single structured surface and an LGP with two opposing structured surfaces at a distance 300 mm from an input edge of the LGP.

FIG. 20A is a plot of modeled LDI as a function of peak width for an LGP incorporating a glass sheet comprising two opposing structured surfaces (FIG. 18) at a distance of 300 mm from the light input edge of the LGP, again with reference to Table 7. FIG. 20A shows that as the measurement distance changes, from 450 mm in FIG. 19A to 300 mm in FIG. 20A, light confinement, represented by LDI, increases. Conversely, the degree of light leakage from the light-injected zone represented by SI in FIG. 20B, is reduced.

Figure 21A:
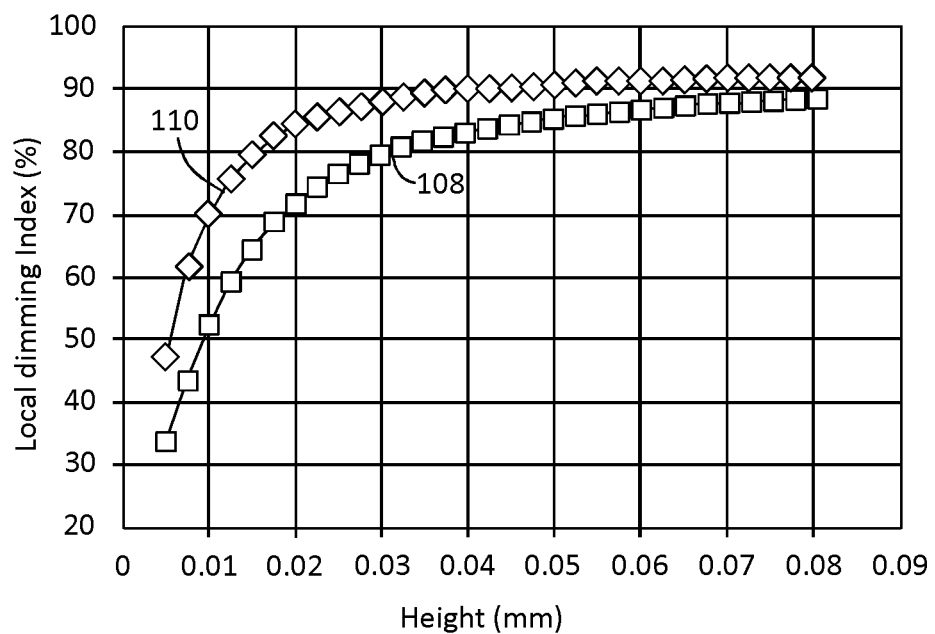
FIG. 21A a plot depicting LDI as a function of channel depth H for an LGP with a single structured surface and an LGP with two opposing structured surfaces at a distance 450 mm from an input edge of the LGP.

FIG. 21A shows modeled LDI at 450 mm distance from input edge as a function of channel depth (peak height) for a glass sheet with one structure surface (curve 108) (see FIG. 3B) and two opposing structures surfaces (curve 110) (see FIG. 18). The peaks and channels for the one structured surface are both 112.5 µm. The two opposing structured surfaces are identical and, again, have channel and peak widths of 112.5 µm. All other LGP parameters are as disclosed in Table 7.

Figure 21B:
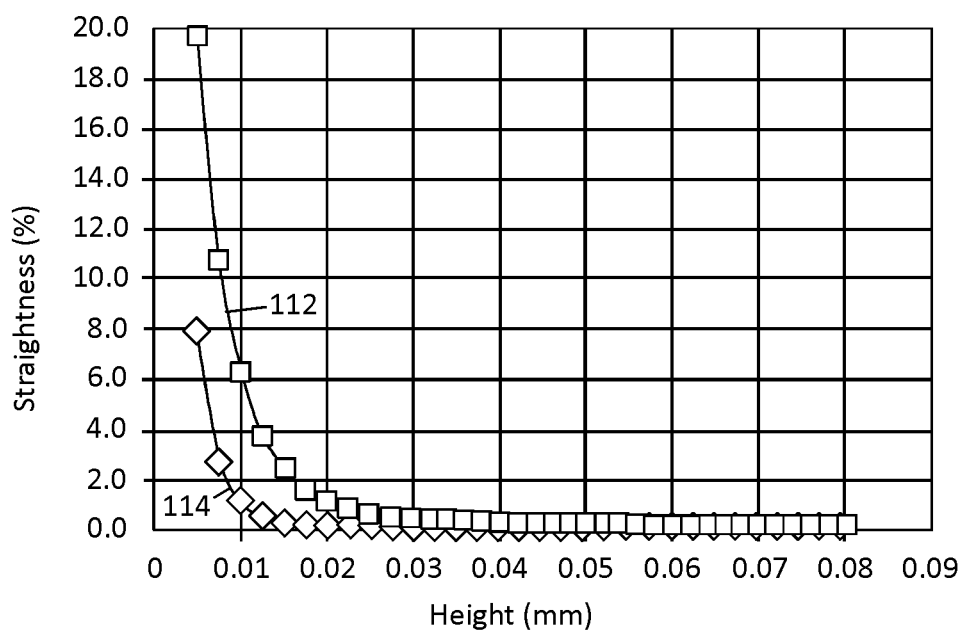
FIG. 21B a plot depicting LDI as a function of channel depth H for an LGP with a single structured surface and an LGP with two opposing structured surfaces at a distance 450 mm from an input edge of the LGP.

FIG. 21B depicts SI for the same LGPs of FIG. 21A, with a single structured surface (112) and two opposing structured surfaces (curve 114). As before, widths W, S of the peaks and channels, respectively, for the one structured surface are both 112.5 µm. The two opposing structured surfaces are also assumed to have channel and peak widths of 112.5 µm. All other LGP parameters are as disclosed in Table 7.

Comparing an LGP with one structured surface to an LGP with two opposing structured surfaces, FIGS. 21A-21B show that both the LDI and SI are improved significantly for two opposing structured surfaces. The data show an LDI larger than 80% and SI less than about 1%, for example equal to or less than about 0.5%, such as equal to or less than about 0.36% are achievable with two opposing structured surfaces for a channel depth (peak height) H greater than 0.015 mm, which is much lower than that (H>0.03 mm) of the LGP with one-side lenticular features for comparable performance. Again, this implies that an LGP with two opposing structured surfaces provides a much wider operating window for fabrication, with potential benefits to the fabricating process and process cost.

Figure 22:
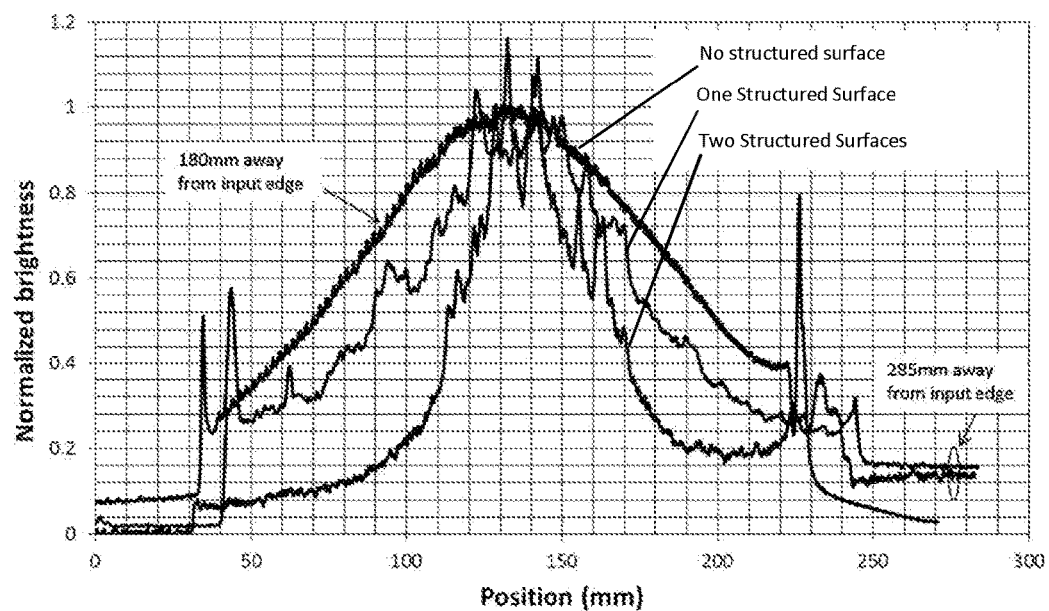
FIG. 22 is a plot illustrating propagating light injected into an LGP from a single LED, and depicting the increasing light confinement with the light-injected zone as the number of structure surfaces increases from zero to two.

FIG. 22 is a plot depicting normalized brightness for three cases wherein a single LED was positioned adjacent an input edge of a glass sheet and brightness measured as a function of lateral position at a specified distance in the glass sheet from the LED. In the first instance, the LED injected light into a glass sheet with no structured surfaces (e.g., an un-etched glass sheet). The brightness curve for the first instance shows a broad distribution pattern, indicating little confinement of the light. The brightness was measured a distance 180 mm from the input edge of the glass sheet.

In the second instance, the LED was used to inject light into the input edge of a glass sheet comprising a single structured surface (see FIG. 3B). Channel depth H was 41 µm, channel width S and peak width W were equal (112.5 µm). Brightness was measured at a location 285 mm from the input edge of the glass sheet. As expected, the measured brightness shows a narrower distribution, indicating better light confinement that the glass sheet with no structured surface even though the distance at which brightness was measured was almost 60% greater than in the first instance.

In the third instance, a glass sheet comprising two opposing structured surfaces (see FIG. 18) was injected with light from the LED, and brightness measured a distance 285 mm from the input edge of the glass sheet. Again, the brightness distribution shows a narrowing. Channel depth H was 45 µm, channel width S and peak width W were equal (112.5 µm).

The data from FIG. 22 supports the data from FIGS. 19A-21B in that better confinement of injected light along a narrow path orthogonal to the input edge can be obtained using a glass sheet with two opposing structured surfaces including alternating rows of peaks and channels. To wit, typical zone widths of 150 mm can be reduced to about 50 mm in accordance with the use of LGP embodiments described herein.

Light confinement using surface structures as disclosed herein can significantly depend on longitudinal sidewall smoothness. LDI values below 80% were found to prevail in the presence of sidewall "scalloping", or "waviness". This is believed to be due to confinement photons impinging on local asperities that disrupt the total internal reflection (TIR) condition, manifesting as an optical loss and driving LDI metrics below 80%.

Figure 23:
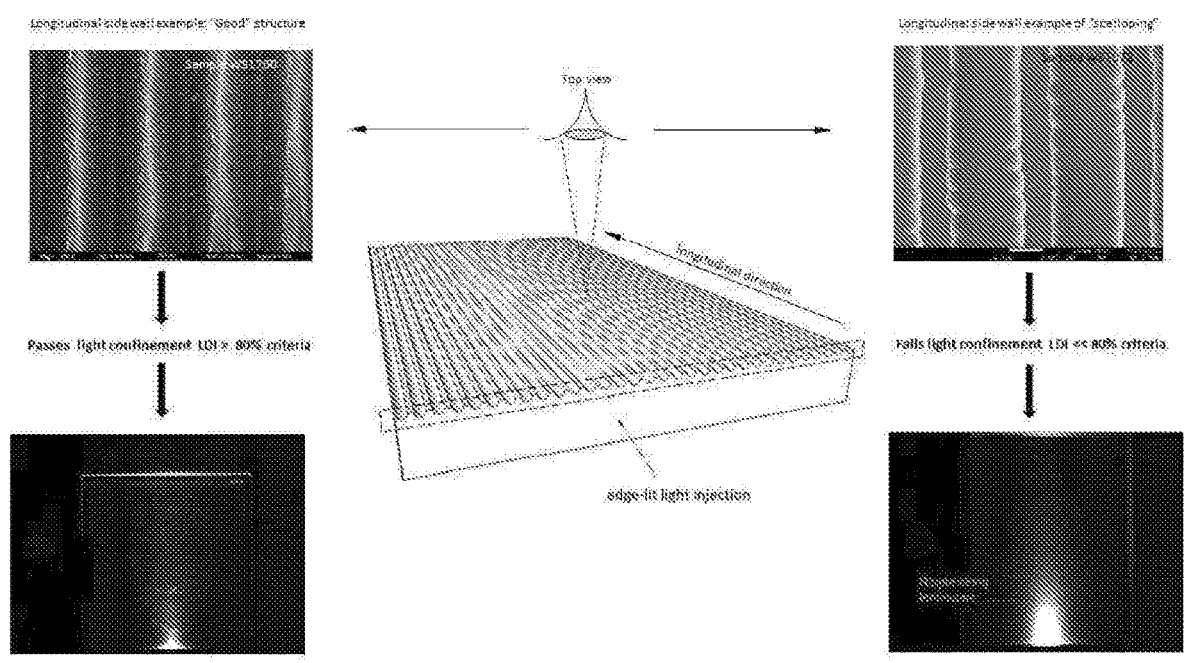
FIG. 23 is an illustration showing smooth (left) and rough (right) channels formed in a glass sheet, and the light pattern formed when injected with light from an LED.

FIG. 23 shows scanning electron microscopy (SEM) images of two samples with different side wall smoothness. The top left SEM image (shown at 100× magnification) illustrates the relative wall smoothness of a first sample when compared with the top right SEM image (shown at 150× magnification). The smoother-walled left sample was prepared with an ESTS etch mask material, diluted 5% by weight with an aromatic solvent, ER-Solv18, without additional adhesion promoter. The screen used for this etch mask application employed a stainless steel 360 mesh screen with 56 µm openings, a string angle of 22°, and a 15 µm thick screen emulsion with 150 µm wide emulsion strips 80 (see FIG. 9). The "kinked tube" morphology of the right sample was prepared with CGSN, using additional adhesion promoter, and with the glass samples pre-treated with a plasma enhanced chemical vapor deposition plasma prior to application of the CGSN etch mask. The screen was a polyester 380 mesh screen with 32 μm openings, a string angle of 10°, and a 15 μm thick emulsion with 200 μm wide cured emulsion patterns 80 (strips). Below each SEM image is the related luminance image used to measure LDI. The LDI value for the "smooth" walled sample on the left was about 85% while the LDI value for the "kinked-tube" shaped structures on the right were well below 80%. The high degree of light confinement for the smooth-wall structures on the left manifests as low scattering near the LED injection end (bottom) of the image, the light propagating along the length of the LGP, and brightening the distal edge, opposite the injection edge. This propagation and brightening of the distal edge is not observed with the "kinked tube" luminance image on the right, and is visually indicative of poor light confinement, low LDI, and readily apparent with the large scattering losses near the LED edge-lit and appearing as a large saturated brightness. LDI values can be brought above 80% for the surface structured LGPs produced by the conditions on the right by employing a stainless steel (SS) mesh for screen printing.

Both Stylus profilometric and Zygo™ (white light interferometric spectroscopy) measurements were performed to characterize the wall smoothness. The sidewall of samples having low LDI values (produced using an CGSN etch mask), due to "kinked tube" morphology were measured by profilometry and Zygo™ white light interferometry. The sidewall of samples having high LDI values (produced using an ESTS or Kiwo etch mask), due to "smooth" morphology were measured by Zygo™ white light interferometry. The ESTS-produced sample was additionally measured by profilometry. The profilometer used to make the sidewall measurements was a KLA-Tencor P11 with a diamond stylus. All scans were performed as follows: 5,877 μm scan length, 50 μm/s scan speed, 100 Hz sampling rate, 2 milligram stylus force, 2 μm stylus radius. No scan filters were applied. To get the 2 μm stylus to sample the sidewalls, a scan trajectory was made to cover numerous peaks and channels.

Figure 24:
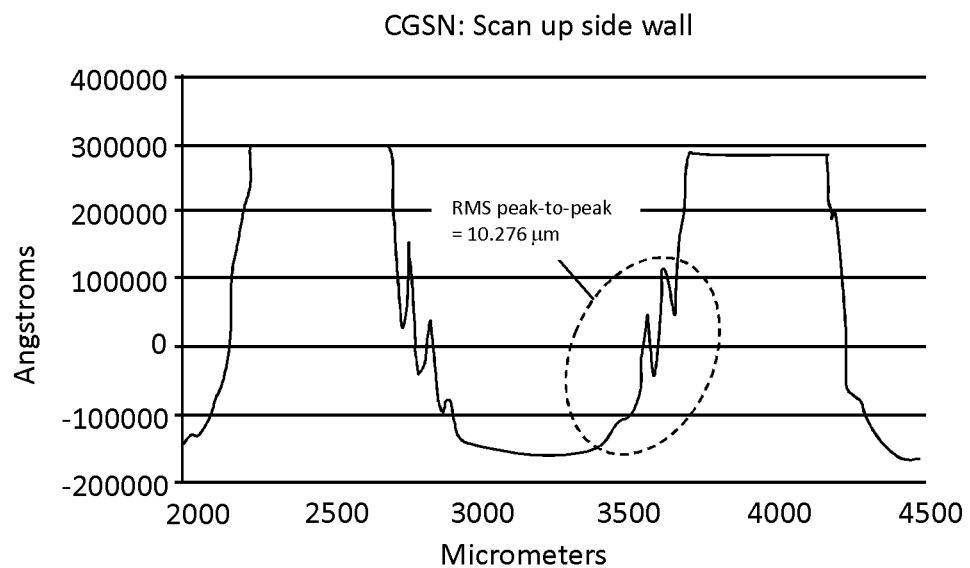
FIG. 24 is a plot showing region of a channel formed in a glass sheet scanned to determine channel wall roughness.
Figure 25:
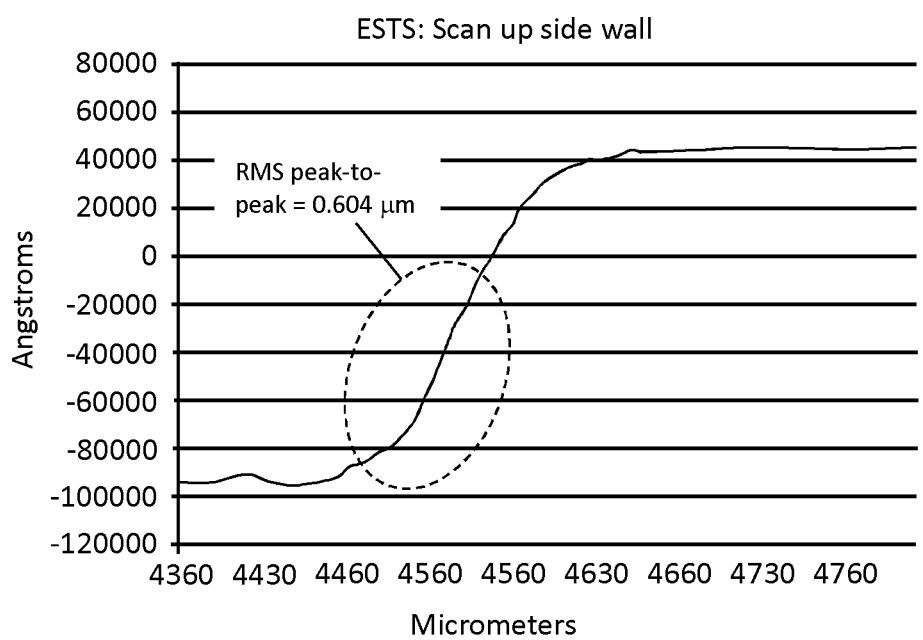
FIG. 25 is another plot showing a region of a channel formed in a glass sheet scanned to determine channel wall roughness.

An illustration of the specific region for the CGSN sample used to make the sidewall RMS roughness calculation is shown in FIG. 24. The RMS value of the CGSN sidewall roughness was 10.276 μm. An illustration of the specific region for the ESTS sample used to make the sidewall RMS roughness calculation is shown in FIG. 25. The RMS value of the ESTS sidewall roughness was 0.604 μm. Accordingly, it is believed RMS roughness values equal to or less than about 12 μm are achievable, as measured by white light interferometry.

Figure 26:
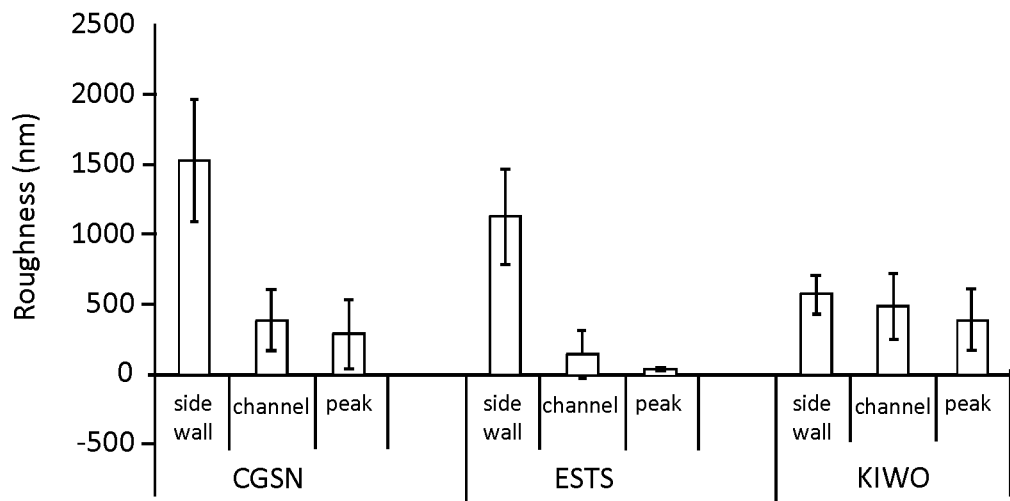
FIG. 26 is a plot showing channel wall roughness as a function of the etch mask material used during the etching process.

Zygo™ white light interferometry was also used to measure the peak-to-channel sidewall roughness of all three samples described above (CGSN, ESTS, and Kiwo). The measured peak-to-channel values of the sidewall roughness are summarized in FIG. 26.

The peak-to-channel sidewall roughness Zygo™ measurements of the CGSN-produced sidewalls exhibits clear statistically-significant roughness that was greater than the roughness for the Kiwo sidewalls, as measured by white light interferometry, as expected. ESTS sidewall roughness, while still less than CGSN sidewall roughness, is not as statistically apparent.

The data show that channel sidewalls comprising an RMS roughness equal to or less than about 5 μm as measured by white light interferometry are obtainable, for example equal to or less than about 1 μm, equal to or less than about 0.7 μm, equal to or less than about 0.5 μm, equal to or less than about 0.3 μm, such as equal to or less than about <0.2 μm. Additionally, a peak-to-channel roughness by white light interferometry equal to or less than about 5 μm can be achieved, for example equal to or less than about 1 μm, equal to or less than about 0.7 μm, equal to or less than about 0.5 μm, equal to or less than about 0.3 μm, such as equal to or less than 0.2 μm.

Using various mask and etch processes disclosed herein, LGPs with smooth channel sidewalls comprising low asperity and low roughness that produce LDI values equal to or greater than about 50%, for example equal to or more than about 60%, equal to or greater than about 70%, equal to or greater than about 80%, such as equal to or greater than 90%, for 150 mm zone width, are obtainable. Additionally, LGPs with a straightness index SI equal to or less than 5%, for example equal to or less than about 1%, such as equal to or less than about 0.5%, such as equal to or less than about 0.1%, for a zone of 150 mm, can be obtained by methods described herein.

Figure 27:
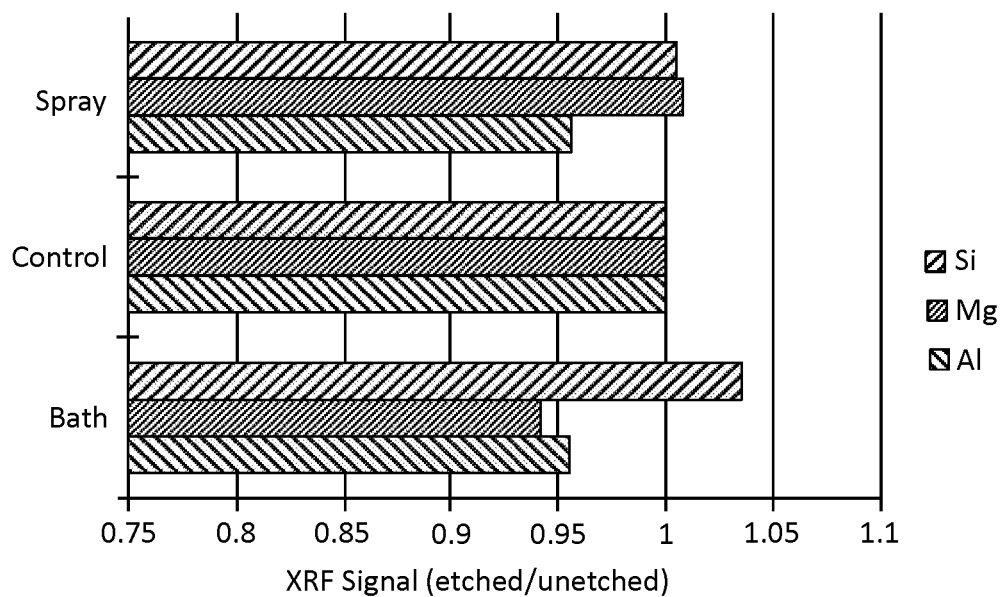
FIG. 27 is a plot illustrating depletion of chemical elements from the surface of a glass sheet as channels are etched into the glass sheet.

HF chemically-etched aluminosilicate glass surfaces have been shown in the literature to experience preferential leaching, contamination, and/or roughening [Mellott et al, Surface and Interface Analysis, "Evaluation of surface preparation methods for glass", 31, pp. 362-368, 2001]. It has been found that etching processes disclosed herein result in compositional changes at the surface of the glass, as revealed by x-ray fluorescence (XRF). X-ray photoelectron spectroscopic data (XPS) revealed significant depletion in both sodium and aluminum. The graph in FIG. 27 shows the normalized results of x-ray fluorescence measurements performed on three glass plate samples (Corning® IRIS™ glass): an untreated sample (middle), a sample that was etched in a bath of etchant (top) comprising by volume 10% HF and 30% $H_2SO_4$, and a sample that was spray etched (bottom) with an etchant comprising by volume 10% HF and 20% $H_2SO_4$. The XRF data revealed significant aluminum depletion in the spray-etched Iris glass surface, within a depth of about 1 μm from the surface of the glass sample, while both aluminum and magnesium were depleted in the bath etched samples. The seeming increase in silicon exhibited during the etching process, and in particular with the spray etching process, is not unusual, and is an artifact of the etching and subsequent XRF measurement. Characterization of the effect of etching on surface chemistry is to perform X-ray fluorescence on un-etched and etched glass samples and compare the elemental concentration.

It will be apparent to those skilled in the art that various modifications and variations can be made to embodiments of the present disclosure without departing from the spirit and scope of the disclosure. Thus, it is intended that the present disclosure cover such modifications and variations provided they come within the scope of the appended claims and their equivalents.

What is claimed is:

1. A method of making a glass article, comprising:
   depositing an adhesion layer on a first major surface of a glass sheet;
   printing an etch mask on the adhesion layer, the etch mask comprising a thermoplastic material comprising one or more of ethylene vinyl acetate materials, propylene materials, polyamide materials, pluronic materials, polyacrylamides, or combinations thereof and printed on the adhesion layer with a heated nozzle, the thermoplastic material solidifying on contact and forming a plurality of parallel rows on the adhesion layer;
   exposing the glass sheet to an etchant, thereby removing portions of the adhesion layer and portions of glass from the first major surface of the glass sheet between the plurality of parallel rows, the removing the portions of glass forming a plurality of channels in the first major surface of the glass sheet; and removing the etch mask and the adhesion layer from the glass sheet, the resultant glass article comprising the glass sheet with the plurality of channels formed in the first major surface, at least one channel of the plurality of channels comprising a depth H in a range from about 5 μm to about 300 μm, a width S defined at H/2, a ratio S/H is in a range from about 1 to about 15, and a ratio M/H of a maximum undercutting M to the channel depth H is controlled within a range from about 1.2 to about 1.8.

2. The method according to claim 1, wherein the adhesion layer comprises a silane layer or a siloxane layer.

3. The method according to claim 1, wherein the printing the etch mask comprises screen printing the etch mask.

4. The method according to claim 3, wherein the screen printing the etch mask comprises a cured emulsion pattern on a surface of a woven screen, and a string angle of the woven screen relative to the cured emulsion pattern is in a range from about 20° to about 45°.

5. The method according to claim 4, wherein the woven screen comprises stainless steel wires.

6. The method according to claim 1, wherein the etchant comprises HF.

7. The method according to claim 6, wherein the etchant further comprises $HNO_3$, $H_2SO_4$, or HCl.

8. The method according to claim 7, wherein the etchant comprises an aqueous solution of 10% by volume HF, and $H_2SO_4$ in an amount from about 10% to about 30% by volume.

9. The method according to claim 8, wherein the etchant comprises $H_2SO_4$ in an amount from about 10% to about 20% by volume.

10. The method according to claim 1, wherein the exposing comprises placing the glass sheet into a bath of the etchant.

11. The method according to claim 10, wherein the exposing comprises agitating the etchant during the exposing.

12. The method according to claim 1, further comprising controlling undercutting of the glass sheet beneath the etch mask by controlling adhesion of the etch mask to the glass sheet.

13. The method according to claim 1, wherein an RMS roughness of a sidewall of the at least one channel is equal to or less than about 5 μm when measured by white light interferometry.

14. The method according to claim 13, wherein the RMS roughness is equal to or less than about 1 μm.

15. The method according to claim 1, wherein the glass article is a light guide plate.

16. The method according to claim 1, wherein a maximum thickness T of the glass sheet is in a range from about 0.1 mm to about 2.1 mm.

17. The method according to claim 16, wherein T is in a range from about 0.6 mm to about 2.1 mm.

18. The method according to claim 1, wherein removing the etch mask comprises removing the thermoplastic etch mask material with a solvent, hot water, or heat.

* * * * *